US008637442B2

(12) United States Patent
Wang et al.

(10) Patent No.: US 8,637,442 B2
(45) Date of Patent: Jan. 28, 2014

(54) NON-FLUOROPOLYMER SURFACE PROTECTION COMPOSITION COMPRISING A POLYORGANOSILOXANE-SILICONE RESIN MIXTURE

(75) Inventors: Xiaoru Jenny Wang, Mason, OH (US); James Lee Danziger, Mason, OH (US); David S. Salloum, West Chester, OH (US); Stephen Thomas Murphy, Harrison, OH (US); Markus Merget, Mehring (DE); Franz X. Wimmer, Burghausen (DE); Richard Becker, Burghausen (DE)

(73) Assignee: The Procter & Gamble Company, Cincinnati, OH (US)

( * ) Notice: Subject to any disclaimer, the term of this patent is extended or adjusted under 35 U.S.C. 154(b) by 142 days.

(21) Appl. No.: 13/237,312

(22) Filed: Sep. 20, 2011

(65) Prior Publication Data
US 2012/0071382 A1    Mar. 22, 2012

Related U.S. Application Data

(60) Provisional application No. 61/384,435, filed on Sep. 20, 2010.

(51) Int. Cl.
C11D 9/36    (2006.01)

(52) U.S. Cl.
USPC ........... 510/347; 510/119; 510/122; 510/220; 510/228; 510/235; 510/276; 510/299; 510/343; 510/400; 510/466

(58) Field of Classification Search
USPC ......... 510/119, 122, 220, 228, 235, 276, 299, 510/343, 347, 400, 466
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |
| 3,159,581 A | 12/1964 | Diehl |
| 3,213,030 A | 10/1965 | Diehl |
| 3,308,067 A | 3/1967 | Diehl |
| 3,400,148 A | 9/1968 | Quimby |
| 3,400,176 A | 9/1968 | Quimby |
| 3,422,021 A | 1/1969 | Roy |
| 3,422,137 A | 1/1969 | Quimby |
| 3,422,176 A | 1/1969 | Jamison |
| 3,664,961 A | 5/1972 | Norris |
| 3,919,678 A | 11/1975 | Penfold |
| 3,929,678 A | 12/1975 | Laughlin et al. |
| 3,933,672 A | 1/1976 | Bartolotta et al. |
| 3,936,537 A | 2/1976 | Baskerville, Jr. et al. |
| 4,136,045 A | 1/1979 | Gault et al. |
| 4,144,226 A | 3/1979 | Crutchfield et al. |
| 4,222,905 A | 9/1980 | Cockrell, Jr. |
| 4,228,042 A | 10/1980 | Letton |
| 4,239,659 A | 12/1980 | Murphy |
| 4,239,660 A | 12/1980 | Kingry |
| 4,246,495 A | 1/1981 | Pressman |
| 4,260,529 A | 4/1981 | Letton |
| 4,412,934 A | 11/1983 | Chung et al. |
| 4,483,779 A | 11/1984 | Llenado et al. |
| 4,483,780 A | 11/1984 | Llenado |
| 4,483,781 A | 11/1984 | Hartman |
| 4,565,647 A | 1/1986 | Llenado |
| 4,663,071 A | 5/1987 | Bush et al. |
| 4,762,645 A | 8/1988 | Tucker et al. |
| 5,332,528 A | 7/1994 | Pan et al. |
| 5,486,303 A | 1/1996 | Capeci et al. |
| 5,489,392 A | 2/1996 | Capeci et al. |
| 5,516,448 A | 5/1996 | Capeci et al. |
| 5,565,422 A | 10/1996 | Del Greco et al. |
| 5,569,645 A | 10/1996 | Dinniwell et al. |
| 5,574,005 A | 11/1996 | Welch et al. |
| 5,576,282 A | 11/1996 | Miracle et al. |
| 5,595,967 A | 1/1997 | Miracle et al. |
| 5,597,936 A | 1/1997 | Perkins et al. |
| 5,691,297 A | 11/1997 | Nassano et al. |
| 5,879,584 A | 3/1999 | Bianchetti et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,060,443 A | 5/2000 | Cripe et al. |
| 6,093,856 A | 7/2000 | Cripe et al. |
| 6,136,769 A | 10/2000 | Asano et al. |
| 6,150,322 A | 11/2000 | Singleton et al. |
| 6,153,577 A | 11/2000 | Cripe et al. |
| 6,221,825 B1 | 4/2001 | Williams, Jr. et al. |

(Continued)

FOREIGN PATENT DOCUMENTS

DE    10 2006 032456    2/2007
EP    1 057 924    12/2000

(Continued)

OTHER PUBLICATIONS

Strange, A.M.W. 'Wet-Strength Paper and Additives in Europe', in "Wet Strength Resins and Their Applications", ed. Lock L. Chan, TAPPI Press, Atlanta, Georgia (1994), Ch. 6, pp. 101-108.

*Primary Examiner* — Charles Boyer
(74) *Attorney, Agent, or Firm* — Andrew J. Mueller; Marianne Dressman

(57) ABSTRACT

The present invention encompasses a surface treatment composition which comprises a polyorganosiloxane fluid-silicone resin mixture and a carrier. The polyorganosiloxane fluid-silicone resin mixture comprises about 2% to about 95%, by weight of the mixture, of one or more polyorganosiloxane fluid compounds; from about 1% to about 10%, by weight of the mixture, of one or more silicone resin, a protonation agent, at least about 5%, by weight of the mixture; of water; and optionally, less than about 5%, by weight of the mixture, of an emulsifier.

5 Claims, No Drawings

(56) References Cited

U.S. PATENT DOCUMENTS

| | | |
|---|---|---|
| 6,225,464 B1 | 5/2001 | Hiler, II et al. |
| 6,306,812 B1 | 10/2001 | Perkins et al. |
| 6,326,348 B1 | 12/2001 | Vinson et al. |
| 6,482,994 B2 | 11/2002 | Scheper et al. |
| 6,551,986 B1 | 4/2003 | Littig et al. |
| 6,642,200 B1 | 11/2003 | Zhang et al. |
| 2005/0009953 A1* | 1/2005 | Shea .......................... 523/169 |
| 2006/0041026 A1* | 2/2006 | Mahr et al. .................. 516/55 |
| 2006/0252668 A1 | 11/2006 | Frankenbach et al. |
| 2010/0015078 A1* | 1/2010 | Li .............................. 424/70.12 |
| 2011/0015332 A1* | 1/2011 | Martin et al. ................ 524/500 |
| 2011/0104094 A1* | 5/2011 | Lee et al. ................... 424/70.11 |

FOREIGN PATENT DOCUMENTS

| | | |
|---|---|---|
| WO | WO 91/06154 | 5/1991 |
| WO | WO 92/06162 | 4/1992 |
| WO | WO 93/19038 | 9/1993 |
| WO | WO 93/19146 | 9/1993 |
| WO | WO 94/09099 | 4/1994 |
| WO | WO 98/35002 | 8/1998 |
| WO | WO 98/35003 | 8/1998 |
| WO | WO 98/35004 | 8/1998 |
| WO | WO 98/35005 | 8/1998 |
| WO | WO 98/35006 | 8/1998 |
| WO | WO 99/05082 | 2/1999 |
| WO | WO 99/05084 | 2/1999 |
| WO | WO 99/05241 | 2/1999 |
| WO | WO 99/05242 | 2/1999 |
| WO | WO 99/05243 | 2/1999 |
| WO | WO 99/05244 | 2/1999 |
| WO | WO 99/07656 | 2/1999 |
| WO | WO 00/23548 | 4/2000 |
| WO | WO 00/23549 | 4/2000 |
| WO | WO 00/32601 | 6/2000 |
| WO | WO 00/47708 | 8/2000 |
| WO | WO 01/42408 A2 | 6/2001 |
| WO | WO 2006/097207 A1 | 9/2006 |
| WO | WO 2006/097227 A2 | 9/2006 |
| WO | WO 2007/065067 A2 | 6/2007 |

* cited by examiner

NON-FLUOROPOLYMER SURFACE PROTECTION COMPOSITION COMPRISING A POLYORGANOSILOXANE-SILICONE RESIN MIXTURE

CROSS REFERENCE TO RELATED APPLICATION

This application claims the benefit of priority to U.S. Provisional Application Ser. No. 61/384,435, filed Sep. 20, 2010, which is herein incorporated by reference.

FIELD OF THE INVENTION

The present invention relates to compositions that may be used to protect surfaces from being stained. In particular, the compositions of the present invention are used to protect fabric from being stained.

BACKGROUND OF THE INVENTION

Numerous attempts have been made to develop a treatment composition that provides protection of surfaces by repelling water and oil based soils from the surface. Fluoropolymers, such as those used in Scotchguard® from 3M, have become well established as stain repellant molecules. However, fluoropolymers are not preferred due to environmental, and health and safety concerns, such as potential and possibility of persistent bioaccumulation and toxicity.

The combination of polyorganosiloxane fluids and silicone resins in attempts to treat hard or soft surfaces are also known. See WO 2007/065067, WO 2006/097207, WO 2006/097227, and EP 1057924 as examples. U.S. Patent Application Publication US 2006/0041026, by Mahr et al. of Wacker-Chemie GmbH, Munich, Germany discloses solvent based compositions comprising polydimethylsiloxane fluids which deliver water-repellant benefits on a wide range of substrates.

Unfortunately, to date, the attempts at non-fluorpolymer continue to demonstrate problems related to low efficiency, difficult to achieve the desired benefits at affordable cost and preferred format; challenging to obtain stable products without significant sacrifices on other desired characteristics of the products. A continued need exists for a non-fluoropolymer technology that delivers significant water and oily soil repellency to obtain a stain prevention benefit with high efficiency in a convenient form.

SUMMARY OF THE INVENTION

The present invention encompasses a surface treatment composition which comprises an aqueous polyorganosiloxane fluid-silicone resin mixture and a carrier. The aqueous polyorganosiloxane fluid-silicone resin mixture comprises from about 2% to about 95%, by weight of the mixture of one or more polyorganosiloxane fluid compounds; from about 1% to about 48%, by weight of the mixture, of one or more silicone resin; a protonating agent; at least about 5%, by weight of the mixture, of water; and optionally, up to about 5%, by weight of the mixture, of an emulsifier.

Each of the one or more polyorganosiloxane fluid compounds contains at least 80 mol % of units selected from the group consisting of units of the general formulae Ia, Ib, II and III:

$$R^1_2SiO_{(2/2)} \quad (Ia),$$

$$R^1_aR^2_bSiO_{(2/2)} \quad (Ib),$$

$$R^3_3SiO_{(1/2)} \quad (II),$$

$$R^3_2R^4SiO_{(1/2)} \quad (III),$$

in which a has the value 0, 1 or 2, b has the value 1 or 2, and the sum of a and b is equal to 2. $R^1$ means monovalent hydrocarbon residues with 1 to 40 carbon atoms, optionally substituted with halogens. $R^2$ means either a) aminoalkyl residues of the general formula IV:

$$-R^5-NR^6R^7 \quad (IV),$$

wherein $R^5$ means divalent hydrocarbon residues with 1 to 40 carbon atoms, $R^6$ means monovalent hydrocarbon residues with 1 to 40 carbon atoms, H, hydroxymethyl or alkanoyl residues, and $R^7$ means a residue of the general formula V $$-(R^8-NR^6)_xR^6 \quad (V),$$

wherein x has the value 0 or an integer value from 1 to 40, and $R^8$ means a divalent residue of the general formula VI $$-(CR^9_2-)_y- \quad (VI),$$

wherein y has an integer value from 1 to 6, and $R^9$ means H or monovalent hydrocarbon residues with 1 to 40 carbon atoms, or b) aminoalkyl residues of the general formula IV wherein $R^6$ and $R^7$ together with the N atom forms a cyclic organic residue with 3 to 8-$CH_2-$ units, and where nonadjacent $-CH_2-$ units can be replaced by units that are chosen from $-C(=O)-$, $-NH-$, $-O-$, and $-S-$. $R^3$ means monovalent hydrocarbon residues with 1 to 40 carbon atoms optionally substituted with halogens. $R^4$ means the residues $-OR$ or $-OH$, wherein R means monovalent hydrocarbon residues with 1 to 40 carbon atoms, optionally substituted with halogens. Additionally, the average ratio of the sum of units of formulae Ia and Ib to the sum of units of formulae II and III within the one or more polyorganosiloxane fluid compounds ranges from about 0.5 to about 500. The average ratio of units of formula II to the units of formula III within the one or more polyorganosiloxane fluid compounds ranges from about 1.86 to about 100. The one or more polyorganosiloxane fluid compounds have an average amine number of at least about 0.01 meq/g.

Each of the one or more silicone resins of the polyorganosiloxane-silicone resin mixture contains at least about 80 mol % of units selected from the group consisting of units of the general formulas VII, VIII, IX and X $$R^{10}_3SiO_{1/2} \quad (VII),$$

$$R^{10}_2SiO_{2/2} \quad (VIII),$$

$$R^{10}SiO_{3/2} \quad (IX),$$

$$SiO_{4/2} \quad (X),$$

in which $R^{10}$ means H, $-OR$, or $-OH$ residues or monovalent hydrocarbon residues with 1 to 40 carbon atoms, optionally substituted with halogens, wherein at least 20 mol % of the units are selected from the group consisting of units of the general formulas IX and X, and a maximum of 10 wt % of the $R^{10}$ residues are $-OR$ and $-OH$ residues.

DETAILED DESCRIPTION OF THE INVENTION

Surface Treatment Composition

The present invention relates to compositions to be used for the treatment of surfaces. Certain embodiments of the compositions provide water and/or oil repellency to the treated surface thereby reducing the propensity of the treated surface to become stained by deposited water or oil based soils.

By "surfaces" it is meant any inanimate surface. These surfaces may include porous or non-porous, absorptive or nonabsorptive substrates. Surfaces may include, but are not limited to, celluloses, paper, natural and/or synthetic textiles fibers and fabrics, imitation leather and leather. Selected embodiments of the present invention are applied to natural and/or synthetic textile fibers and fabrics.

By "treating a surface" it is meant the application of the composition onto the surface. The application may be performed directly, such as the spray or wiping the composition onto a hard surface. The composition may or may not be rinsed off depending on the desired benefit.

The present invention also encompasses the treatment of a fabric as the surface. This can be done either in a "pretreatment mode", where the composition is applied neat onto the fabric before the fabrics are washed or rinsed, or a "post-treatment mode", where the composition is applied neat onto the fabric after the fabric is washed or rinsed. The treatment may be performed in a "soaking mode", where the fabric is immersed and soaked in a bath of neat or diluted composition. The treatment may also be performed in a "through the wash" or "through the rinse" mode where the treatment composition, as defined herein, is added to the wash cycle or the rinse cycle of a typical laundry wash machine cycle. When used in the wash or rinse cycle, the compositions are typically used in a diluted form. By "diluted form" it is meant that the compositions may be diluted in the use, preferably with water at a ratio of water to composition up to 500:1, or from 5:1 to 200:1, or from 10:1 to 80:1.

Aqueous Polyorganosiloxane-Silicone Resin Mixture

The present invention encompasses a surface treatment composition which comprises a aqueous polyorganosiloxane-silicone resin mixture and a carrier. The aqueous polyorganosiloxane-silicone resin mixture comprises from about 2% to about 95%, by weight of the mixture of one or more polyorganosiloxane fluid compounds; from about 1% to about 48%, by weight of the mixture, of one or more silicone resins; a protonating agent; at least about 5%, by weight of the mixture, of water; and optionally, up to about 5%, by weight of the mixture, of an emulsifier.

The aqueous polyorganosiloxane-silicone resin mixture of the compositions of the present invention comprises between about 2% and about 95%, by weight of the mixtures, of one or more polyorganosiloxane fluid compounds. Certain embodiments of the aqueous polyorganosiloxane-silicone resin mixture may comprise between about 10% to about 75% of the polyorganosiloxane fluid compounds. Other embodiments may comprise between about 20% to about 50% of the polyorganosiloxane fluid compounds.

Each of the one or more polyorganosiloxane fluid compounds contains at least 80 mol % of units selected from the group consisting of units of the general formulae I, II and III:

  (Ia),

  (Ib),

  (II),

  (III), in which a has the value 0, 1 or 2, b has the value 1 or 2, and the sum of a and b is equal to 2. In selected embodiments the one or more polyorganosiloxane fluid compounds may contain at least about 90% or at least 95% of the Ia, Ib, II, or III units. $R^1$ means monovalent hydrocarbon residues with 1 to 40 carbon atoms, optionally substituted with halogens. $R^2$ means either a) aminoalkyl residues of the general formula IV:

  (IV), wherein $R^5$ means divalent hydrocarbon residues with 1 to 40 carbon atoms, $R^6$ means monovalent hydrocarbon residues with 1 to 40 carbon atoms, H, hydroxymethyl or alkanoyl residues, and $R^7$ means a residue of the general formula V

  (V), wherein x has the value 0 or an integer value from 1 to 40, and $R^8$ means a divalent residue of the general formula VI

  (VI), wherein y has an integer value from 1 to 6, and $R^9$ means H or monovalent hydrocarbon residues with 1 to 40 carbon atoms, or b) aminoalkyl residues of the general formula IV wherein $R^6$ and $R^7$ together with the N atom forms a cyclic organic residue with 3 to 8 —$CH_2$— units, and where nonadjacent —$CH_2$— units can be replaced by units that are chosen from —C(═O)—, —NH—, —O—, and —S—. $R^3$ means monovalent hydrocarbon residues with 1 to 40 carbon atoms optionally substituted with halogens. $R^4$ means the residues —OR or —OH, wherein R means monovalent hydrocarbon residues with 1 to 40 carbon atoms, optionally substituted with halogens.

Additionally, the average ratio of the sum of units of formulae Ia and Ib to the sum of units of formulae II and III within the one or more polyorganosiloxane fluid compounds may range from about 0.5 to about 500. The average ratio of units of formula II to the units of formula III within the one or more polyorganosiloxane fluid compounds may range from about 1.86 to about 100. The one or more polyorganosiloxane fluid compound have an average amine number of at least about 0.01 meq/g of polyorganosiloxane fluid compounds.

The monovalent hydrocarbon residues R, $R^1$, $R^3$, $R^6$, $R^9$ and $R^{10}$ can be halogen-substituted, linear, cyclic, branched, aromatic, saturated or unsaturated. Some embodiments of the monovalent hydrocarbon residues R, $R^1$, $R^3$, $R^6$, $R^9$ and $R^{10}$ have from 1 to 6 carbon atoms, including alkyl residues and phenyl residues. Certain embodiments have halogen substituents such as fluorine and/or chlorine. Monovalent hydrocarbon residues R, $R^1$, $R^3$, $R^6$, $R^9$ and $R^{10}$ methyl, ethyl and phenyl are useful in the present compositions.

The divalent hydrocarbon residues $R^5$ can be halogen substituted, linear, cyclic, branched, aromatic, saturated or unsaturated. The residues $R^5$ may have from 1 to 10 carbon atoms. Alkylene residues with 1 to 6 carbon atoms, including propylene, are especially useful embodiments. If $R^5$ is halogenated, the halogen substituents may be fluorine and chlorine.

Residues $R^6$ may be alkyl and/or alkanoyl residues. Embodiments of $R^6$ may contain halogen substituents such as fluorine and chlorine. Embodiments of $R^6$ which are alkanoyl residues may have the general formula —C(═O)$OR^{11}$, where $R^{11}$ has the meanings and preferred meanings of $R^1$ described above. Especially preferred substituents $R^6$ are methyl, ethyl, cyclohexyl, acetyl and hydrogen.

Cyclic organic residues may be formed from the connection of $R^6$ and $R^7$ in the general formula IV together with the bonded N atom. These cyclic residues include pentacycles and hexacycles, such as the residues of pyrrolidine, pyrrolidin-2-one, pyrrolidin-2,4-dione, pyrrolidin-3-one, pyrazol-3-one, oxazolidine, oxazolidin-2-one, thiazolidine, thiazolidin-2-one, piperidine, piperazine, piperazin-2,5-dione and morpholine.

Embodiments of the residues $R^2$ include —$CH_2NR^6R^7$, —$(CH_2)_3NR^6R^7$, —$(CH_2)_3N(R^6)$, and —$(CH_2)_2N(R^6)_2$. Examples include the aminoethylaminopropyl and cyclohexylaminopropyl residues.

In certain embodiments of the polyorganosiloxane fluid b has the value 1 or 2. Some embodiments have the sum of a+b having an average value of from about 1.9 to about 2.2.

In some useful embodiments the ratio of a to b is chosen so that the polyorganosiloxane fluid compounds have an amine number of at least about 0.1, and some at least 0.3 meq/g. The amine number designates the number of milliliters of 1N hydrochloric acid which are required for neutralizing 1 gram of the poyorganosiloxane fluid. Some embodiments have the amine number of the polyorganosiloxane fluid is being a maximum of about 7 meq/g. Others have a maximum of about 4.0 meq/g, and yet others have a maximum of 3.0 meq/g polyorganosiloxane fluid. x may have the value of 0 or a value from 1 to 18. Certain embodiments have x being from 1 to 6. Certain embodiments of the fluid have y having a value of 1, 2 or 3. The polydimethylsiloxane fluids contain at least 3, especially at least 10 units of the general formula I.

The viscosity of the polyorganosiloxane fluid compounds is at least about 1 mPa·s, at 25° C., especially at least about 10 mPa·s, and has a maximum of about 100,000 mPa·s, especially about 10,000 mPa·s. Certain embodiments of the polyorgansiloxane fluid compound have a viscosity of at least about 100 mPa·s and a maximum of 5,000 mPa·s, at 25° C.

The average ratio of the units of the general formula I to the sum of units II and III may range from about 0.5 to about 500. In certain embodiments the ratio may be at least about 10, particularly at least about 50 and range to a maximum of about 250, particularly a maximum of about 150.

The ratio of the units II to units III may range from about 1.86 to about 100. Useful embodiments may have this ratio being at least about 3 and may range to a maximum of about 70. Other embodiments may have this ration being at least about 6 or at least about 10, and may range to a maximum of about 50.

The aqueous polyorganosiloxane-silicone resin mixture also comprises from about 1% to about 48%, by weight of the mixture, of one or more silicone resins. Certain embodiments of the aqueous polyorganosiloxane-silicone resin mixture may comprise between about 1% and about 20% of the silicone resins. Other embodiments of the mixture may comprise between about 2% and about 10% of the silicone resins. Other embodiments of the mixture may comprise between about 3% and about 7.5% of the silicone resins.

Each of the one or more silicone resins of the polyorganosiloxane-silicone resin mixture contains at least 80 mol % of units selected from the group consisting of units of the general formulas VII, VIII, IX and X $$R^{10}_3 SiO_{1/2} \quad (VII),$$

$$R^{10}_2 SiO_{2/2} \quad (VIII),$$

$$R^{10} SiO_{3/2} \quad (IX),$$

$$SiO_{4/2} \quad (X),$$

in which $R^{10}$ means H, —OR or —OH residues or monovalent hydrocarbon residues with 1 to 40 carbon atoms, optionally substituted with halogens. Certain useful embodiments of the polyorganosiloxane-silicone resin mixture may comprise silicone resins comprising at least about 90%, at least about 95%, or at least about 98% of units selected from the group consisting of units of the general formulas VII, VIII, IX and X.

The silicone resins are preferably MQ silicone resins (MQ) comprising at least 80 mol % of units, preferably at least 95 mol % and particularly at least 97 mol % of units of the general formulae VII and X. The average ratio of units of the general formulae VII to X is preferably at least 0.25, particularly at least 0.5 and preferably 4, more preferably at most particularly at most 1.5.

The silicone resins (S) are also preferably DT silicone resins (DT) comprising at least 80 mol % of units, preferably at least 95 mol % and particularly at least 97 mol % of units of the general formulae VIII and IX. The average ratio of units of the general formulae VIII to IX is preferably at least 0.01, particularly at least 0.02 and preferably at most 3.5, more preferably at most 0.5.

At least 20 mol % of the units of the silicone resins are selected from the group consisting of units of the general formulas IX and X. Other embodiments comprise silicone resins have at least 40% or even 50% of units selected from the group consisting of units of the general formulas IX and X, A maximum of 10 wt % of the $R^{10}$ residues in the one or more silicone resins are —OR and —OH residues. In other useful embodiments a maximum of 3% or even 1% may be desired.

The aqueous polyorganosiloxane-silicone resin mixture comprises from about 5% to about 92%, by weight of the mixture, of water. Embodiments of the mixtures may include water in amounts of from about 30% to about 80%, by weight, and particularly from about 50% to about 80% by weight of the mixture.

The water is completely ion-free or salt-containing water, preferably completely ion-free water.

The protonating agent is preferably a monoprotic or multiprotic, water-soluble or water-insoluble, organic or inorganic acid. Particular preference is given to formic acid, acetic acid, sulphuric acid, phosphoric acid, hydrochloric acid, citric acid or mixtures thereof. The protonating agent is added in an amount necessary to achieve a mixture pH of from about 2.0 to about 8.0. Certain embodiments of the mixtures comprise the protonating agent in an amount necessary to achieve a mixture pH of from about 2.8 to about 7.2. Other embodiments of the mixtures comprise the protonating agent in an amount necessary to achieve a mixture pH of from about 3.5 to about 6.5.

The aqueous polyorganosiloxane-silicone resin mixture may, optionally, utilize minimal amounts of emulsifiers. This may provide a distinctly improved hydrophobic effect. If used, the mixture may comprise up to about 5% of the emulsifier. Certain embodiments of the mixture may comprise from about 0.01% to about 1%, by weight of the mixture, of the emulsifier.

Examples of emulsifiers are sorbitan esters of fatty acids having 10 to 22 carbon atoms; polyoxyethylene sorbitan esters of fatty acids having 10 to 22 carbon atoms and an ethylene oxide content of up to 35 percent; polyoxyethylene sorbitan esters of fatty acids having 10 to 22 carbon atoms; polyoxyethylene derivatives of phenols having 6 to 20 carbon atoms on the aromatic and an ethylene oxide content of up to 95 percent; fatty amino- and amidobetaines having 10 to 22 carbon atoms; polyoxyethylene condensates of fatty acids or fatty alcohols having 8 to 22 carbon atoms with an ethylene oxide content of up to 95 percent; fatty amine oxides having 10 to 22 carbon atoms; fatty imidazolines having 6 to 20 carbon atoms; fatty amidosulfobetaines having 10 to 22 carbon atoms; quarternary emulsifiers, such as fatty ammonium compounds having 10 to 22 carbon atoms; fatty morpholine oxides having 10 to 22 carbon atoms; alkali metal salts of carboxylated, ethoxylated alcohols having 10 to 22 carbon atoms and up to 95 percent of ethylene oxide; ethylene oxide condensates of fatty acid monoesters of glycerol having 10 to 22 carbon atoms and up to 95 percent of ethylene oxide;

mono- and diethanolamides of fatty acids having 10 to 22 carbon atoms; phosphate esters.

It is well known in the area of emulsifiers, the opposition ions in the case of cationic emulsifiers, the opposition ion is a halide, sulfate or methylsulfate. Chlorides are the most industrially available compounds.

The abovementioned fatty structures are usually the lipophilic half of the emulsifiers. A customary fatty group is an alkyl group of natural or synthetic origin. Known unsaturated groups are the oleyl, linoleyl, decenyl, hexadecenyl and dodecenyl radicals. Alkyl groups may be cyclic, linear or branched. Other possible emulsifiers are sorbitol monolaurate/ethylene oxide condensates; sorbitol monomyristate/ethylene oxide condensates; sorbitol monostearate/ethylene oxide condensates; dodecylphenol/ethylene oxide condensates; myristylphenol/ethylene oxide condensates; octylphenyl/ethylene oxide condensates; stearylphenol ethylene oxide condensates; lauryl alcohol/ethylene oxide condensates; stearyl alcohol/ethylene oxide condensates; decylaminobetaine; cocoamidosulfobetaine; olylamidobetaine; cocoimidazoline; cocosulfoimidazoline; cetylimidazoline; 1-hydroxyethyl-2-heptadecenylimidazoline; n-cocomorpholine oxide; decyldimethylamine oxide; cocoamidodimethylamine oxide; sorbitan tristearate having condensed ethylene oxide groups; sorbitan trioleate having condensed ethylene oxide groups; trimethyldodecylammonium chloride; trimethylstearylammonium methosulfate. The optional emulsifier may also comprise a protective colloid. Suitable protective colloids (PC) are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl and hydroxypropyl derivatives thereof, dextrins and cyclodextrins; proteins, such as casein or caseinate, soybean protein, gelatin; ligninsulfonates; synthetic polymers, such as poly(meth)acrylic acid, copolymers of (meth)acrylates with carboxy-functional comonomer units, poly(meth)acrylamide, polyvinylsulfonic acids and the water-soluble copolymers thereof; melamine formaldehyde sulfonates, naphthalene formaldehyde sulfonates, styrene-maleic acid and vinyl ether-maleic acid copolymers; cationic polymers, such as poly-DADMAC.

Partly hydrolyzed or completely hydrolyzed polyvinyl alcohols having a degree of hydrolysis of from 80 to 100 mol %, in particular partly hydrolyzed polyvinyl alcohols having a degree of hydrolysis of from 80 to 95 mol % are preferred. Examples of these are partly hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates, such as diisopropyl maleate and diisopropyl fumarate, vinyl chloride, vinyl alkyl ethers, such as vinyl butyl ether, olefins, such as ethene and decene. Examples of such vinyl esters are those which are offered as vinyl versatate under the designations VeoVa®5, VeoVa®9, VeoVa®10 and VeoVa®11. The proportion of the hydrophobic units is preferably from 0.1 to 10% by weight, based on the total weight of the partly hydrolyzed polyvinyl alcohol. It is also possible to use mixtures of said polyvinyl alcohols.

Further polyvinyl alcohols which are most preferred are partly hydrolyzed, hydrophobized polyvinyl acetates which are obtained by polymer-analogous reaction, for example acetalation of the vinyl alcohol units with $C_1$- to $C_4$-aldehydes, such as butyraldehyde. The proportion of the hydrophobic units is preferably from 0.1 to 10% by weight, based on the total weight of the partly hydrolyzed polyvinyl acetate. The degree of hydrolysis is from 80 to 95 mol %, preferably from 85 to 94 mol %. Said protective colloids (PC) are obtainable by means of processes known to the person skilled in the art. The mixtures (M) preferably include at most 50 parts by weight and particularly at most 30 parts by weight and preferably at least 0.1 part by weight of such protective colloids (PC).

The polyorganosiloxane-silicone resin mixtures of the present invention may additionally comprise other silicones, for example liquid silicones, silicone waxes, cyclic silicones or solid silicones. When further silicones are used, they may be used at level up to about 10%, by weight of the mixtures. Certain embodiments may comprise from about 1% to about 8% of the other silicones, while others may comprise from about 2% to about 5%.

The aqueous polyorganosiloxane-silicone resin mixture may also comprise auxiliary stabilizers selected from the group consisting of mono- or polyalcohols and ethers thereof which have a boiling point or boiling range of at most 260° C. at 0.10 MPa, and mixtures thereof. Examples of monoalcohols are ethanol, n-propanol, isopropanol and butanol. Examples of polyalcohols are ethylene glycol and propylene glycol. Examples of polyalcohol ethers are ethylene glycol monobutyl ether, ethylene glycol monoethyl ether and diethylene glycol monoethyl ether. If used, the mixtures may include auxiliary stabilizers at levels up to about 10%. Certain embodiments of the mixtures optionally comprise from about 1% to about 7% while others comprise from about 2% to about 5% of the auxiliary stabilizer.

The aqueous polyorganosiloxane-silicone resin mixture may additionally include further substances, such as preservatives, scents, corrosion inhibitors and dyes. Examples of preservatives are alcohols, formaldehyde, parabens, benzyl alcohol, propionic acid and salts thereof and also isothiazolinones. The mixtures may further include yet other additives, such as non-silicon-containing oils and waxes. Examples thereof are rapeseed oil, olive oil, mineral oil, paraffin oil or non-silicon-containing waxes, for example carnauba wax and candelilla wax or montan acid and montan ester waxes, incipiently oxidized synthetic paraffins, polyethylene waxes, polyvinyl ether waxes and metal-soap-containing waxes, of which carnauba waxes, paraffin wax and polyethylene waxes are preferred and paraffin waxes are particularly preferred. The mixtures may include up to 5% by weight of the mixture and where used the mixtures may comprise such further substances at levels between about 0.05% to about 2.5% by weight of the mixture.

The carrier of the surface treatment composition may be any known material, generally, but not necessarily, a liquid useful in delivering the aqueous polyorganosiloxane-silicone resin mixture to the surface which is desired to be treated. The carrier may be as simple as a single component delivery vehicle such as water or alcohol which would allow the mixture to be sprayed onto a surface. Alternatively, the carrier may be complex such as a cleaning composition such as a laundry detergent where the mixture would be applied in conjunction with the other beneficial uses of the complex carrier.

Optional Composition Adjunct Ingredients

To enhance the performance of the surface treatment composition of the present invention, additional deposition aid polymers may be added. As used herein, "deposition aid polymer" refers to any polymer or combination of polymers that enhance the deposition of fabric care agent(s) onto fabric during laundering. Without wishing to be bound by theory, it is believed that in order to drive the fabric care agent onto the fabric, the net charge of the deposition polymer is positive in order to overcome the repulsion between the fabric care agent and the fabric since most fabrics are comprised of fabric fibers that have a slightly negative charge in aqueous environments. Examples of fibers exhibiting a slightly negative charge in water include but are not limited to cotton, rayon, silk, wool, and the like.

The deposition aid of the present disclosure may be a cationic or amphoteric oligomer or polymer or a combination or blend of cationic and/or amphoteric oligomers and/or polymers that enhance the deposition of the fabric care composition onto the surface of the fabric or fiber during the treatment process. Without wishing to be bound by any theory, it is believed that in order to drive the fabric care agent onto the surface of the fabric, the net charge of the deposition aid, such as a positive net charge, may be used to overcome repulsive interactions between the fabric care agent and the fabric surface. For example, many fabrics (such as cotton, rayon, silk, wool, etc.) are comprised of fibers that may have a slightly negative charge in aqueous environment. In certain embodiments, an effective amphoteric or cationic oligomeric/polymeric deposition aid may be characterized by a strong binding capability with the present fabric care agents and compositions via physical forces, such as, van der Waals forces, and/or non-covalent chemical binds such as hydrogen bonding and/or ionic bonding. In some embodiments, the deposition aids may also have a strong affinity to natural fabric fibers, such as cotton or wool fibers.

In particular embodiments, the deposition aids described herein are water soluble and may have flexible molecular structures such that they may associate with the surface of a fabric care agent particle or hold several of the particles together. Therefore, the deposition enhancing agent may typically not be cross-linked and typically does not have a network structure.

According to certain embodiments of the fabric care compositions of the present disclosure, the amphoteric or cationic oligomeric/polymeric deposition aid may be a cationic polymer selected from the group consisting of a cationic polysaccharide, a cationic guar, a cationic lignin, a cationic polymer, an amine containing polymer, an amide containing polymer, and combinations of any thereof. The term "cationic polymer" refers to a polymer having a net cationic charge. Polymers containing amine groups or other protonatable groups are included in the term "cationic polymer," wherein the polymer is protonated at the pH of intended use. In specific embodiments, the cationic polymer may be a branched cationic polymer. For example, according to certain embodiments, the cationic polymer may be a branched cationic polysaccharide, wherein the polysaccharide has a fraction of alpha-1,4-glycosidic linkages of at least about 0.01 up to about 1.0.

In another aspect, the fabric care composition and/or treatment composition may comprise a deposition aid selected from the group consisting of cationic or amphoteric polysaccharides. Suitable cationic polysaccharides for the various embodiments of the deposition aids described herein include, but are not limited to, cationic cellulose derivatives, cationic and amphoteric cellulose ethers, cationic or amphoteric galactomannan, cationic guar gum derivatives, cationic or amphoteric starches and derivatives, and cationic chitosan and derivatives. In specific embodiments, the branched cationic polysaccharides may be a branched cationic starch.

In some embodiments, the cationic polysaccharide deposition aid may be a cationic guar derivative having a general formula (A):

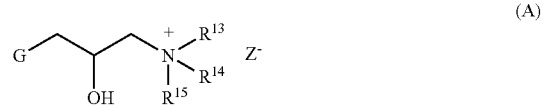

where G is a galactomannan backbone; $R^{13}$ is a group selected from $CH_3$, $CH_2CH_3$, phenyl, a $C_8$-$C_{24}$ alkyl group (linear or branched) and combinations thereof; $R^{14}$ and $R^{15}$ are groups independently selected from $CH_3$, $CH_2CH_3$, phenyl, and combinations thereof; and $Z^-$ is a suitable anion. In certain embodiments, the guar derivatives include guar hydroxypropyl trimethyl ammonium chloride. Examples of cationic guar gums are Jaguar™ C13 and Jaguar™ Excel, available from Rhodia, Inc. (Cranberry, N.J.).

In one aspect, the fabric care and/or treatment composition may comprise from about 0.01% to about 10%, or from about 0.05 to about 5%, or from about 0.1 to about 3% of the deposition aid. Suitable deposition aids are disclosed in, for example, U.S. application Ser. No. 12/080,358.

In one aspect, the one or more deposition aids may be a cationic polymer. In one aspect, the deposition aid may comprise a cationic polymer having a cationic charge density of from about 0.1 meq/g to about 23 meq/g from about 0.1 meq/g to about 12 meq/g, or from about 0.3 meq/g to about 7 meq/g, at the pH of intended use of the composition. For amine-containing polymers, wherein the charge density depends on the pH of the composition, charge density is measured at the pH of the intended use of the product. Such pH will generally range from about 2 to about 11, more generally from about 2.5 to about 9.5. Charge density is calculated by dividing the number of net charges per repeating unit by the molecular weight of the repeating unit. The positive charges may be located on the backbone of the polymers and/or the side chains of polymers. For example, for the copolymer of acrylamide and diallyldimethylammonium chloride with a monomer feed ratio of 70:30, the charge density of the feed monomers is about 3.05 meq/g. However, if only 50% of diallyldimethylammonium is polymerized, the polymer charge density is only about 1.6 meq/g. The polymer charge density may be measured by dialyzing the polymer with a dialysis membrane or by NMR. For polymers with amine monomers, the charge density depends on the pH of the carrier. For these polymers, charge density is measured at a pH of 7.

In one aspect, the cleaning and/or treatment composition may comprise an amphoteric deposition aid polymer so long as the polymer possesses a net positive charge. The polymer may have a cationic charge density of from about 0.05 meq/g to about 12 meq/g.

Suitable polymers may be selected from the group consisting of cationic or amphoteric polysaccharides, polyethylene imine and its derivatives, and a synthetic polymer made by polymerizing one or more cationic monomers selected from the group consisting of N,N-dialkylaminoalkyl acrylate, N,N-dialkylaminoalkyl methacrylate, N,N-dialkylamino alkyl acrylamide, N,N-dialkylaminoalkylmethacrylamide, quaternized N,N dialkylamino alkyl acrylate, quaternized N,N-dialkylaminoalkyl methacrylate, quaternized N,N-dialkylaminoalkyl acrylamide, quaternized N,N-dialkylaminoalkylmethacrylamide, methacryloamidopropyl-pentamethyl-1,3-propylene-2-ol-ammonium dichloride, N,N,N,N', N',N'',N''-heptamethyl-N''-3-(1-oxo-2-methyl-2-propenyl) aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkyl methacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. The polymer may optionally be branched or cross-linked by using branching and crosslinking monomers. Branching and cros slinking monomers include ethylene glycoldiacrylate divinylbenzene, and butadiene. A suitable polyethyleneinine useful herein is that sold under the trade name Lupasol® by BASF, AG, Lugwigshafen, Germany In another aspect, the deposition aid may be selected from the group consisting of cationic polysaccharides, cationic hydroxy ethyl cellulose (such as Cat HEC polymer PK having a molecular weight of about 400,000 Daltons and a charge density of 1.25 meq/g, commercially available from Dow Chemical, Midland Mich.), cationic starches (such as Akzo, EXP 5617-2301-28 (National Starch 126290-82), available from National Starch, Bridgewater, N.J.), polyethylene imine and its derivatives, poly(acrylamide-co-diallyldimethylammonium chloride), poly(acrylamide-methacrylamidopropyl-trimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly (hydroxpropylacrylate-co-dimethyl aminoethyl methacrylate), poly(hydroxpropyl acrylate-co-methacrylamidopropyltrimethylammonium chloride), poly (acrylamide-co-diallyldimethylammonium chloride-co-acrylic acid), poly(acrylamide-methacrylamido propyltrimethyl ammonium chloride-co-acrylic acid), poly (diallyldimethyl ammonium chloride) (such as that sold under trade names: Merquat® 100 and having a molecular weight of 150,000 Daltons, commercially available from Nalco Co., Naperville, Ill.), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole) and poly(acrylamide-co-methacryloamidopropyl-pentamethyl-1,3-propylene-2-ol-ammonium dichloride). In a specific embodiment, the deposition aid may be a terpolymers with a mole ration of 90% polyacrylamide:5% acrylic acid:5% methylenebis-acrylamide-methacrylamidopropyl trimethylammonium chloride ("MAPTAC", sold under the trade names TX12528SQ, or Merquat® 5300, commercially available from Nalco Co, Naperville, Ill.). Suitable deposition aids include Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients.

In one aspect, the deposition aid may comprise polyethyleneimine or a polyethyleneimine derivative. In another aspect, the deposition aid may comprise a cationic acrylic based polymer. In another aspect, the deposition aid may comprise a cationic polyacrylamide. In another aspect, the deposition aid may comprise a polymer comprising polyacrylamide and polymethacrylamidoproply trimethylammonium cation. In another aspect, the deposition aid may comprise poly(acrylamide-N,N-dimethylaminoethyl acrylate) and its quaternized derivatives. In this aspect, the deposition aid may be that sold under the trade name Sedipur®, available from BTC Specialty Chemicals, a BASF Group, Florham Park, N.J. In another aspect, the deposition aid may comprise poly (acrylamide-co-methacrylamidopropyltrimethyl ammonium chloride). In another aspect, the deposition aid may be a non-acrylamide based polymer, such as that sold under the trade name Rheovis® CDE, available from Ciba Specialty Chemicals, a BASF group, Florham Park, N.J., or as disclosed in U.S. Published Application No. 2006/0252668.

Another group of suitable cationic polymers may include alkylamine-epichlorohydrin polymers which are reaction products of amines and oligoamines with epicholorohydrin, for example, those polymers listed in, for example, U.S. Pat. Nos. 6,642,200 and 6,551,986. Examples include dimethylamine-epichlorohydrin-ethylenediamine, available under the trade name Cartafix® CB and Cartafix® TSF from Clariant, Basel, Switzerland.

Another group of suitable synthetic cationic polymers may include polyamidoamine-epichlorohydrin (PAE) resins of polyalkylenepolyamine with polycarboxylic acid. The common PAE resins may include the condensation products of diethylenetriamine with adipic acid followed by a subsequent reaction with epichlorohydrin. Suitable examples are available from Hercules Inc. of Wilmington Del. under the trade name Kymene™ or from BASF AG (Ludwigshafen, Germany) under the trade name Luresin™. These polymers are described in "Wet Strength Resins and their Applications," edited by L. L. Chan, TAPPI Press (1994).

In various embodiments, the weight-average molecular weight of the oligomeric/polymeric deposition aids may range from about 500 to about 10,000,000, from about 1,000 to about 5,000,000, or from about 10,000 to about 5,000,000 Daltons, as determined by size exclusion chromatography relative to polyethyleneoxide standards with $R^1$ detection. In one aspect, the MW of the cationic polymer may be from about 50,000 to about 3,000,000 Daltons.

The cationic polymers may contain charge neutralizing anions such that the overall polymer is neutral under ambient conditions. Non-limiting examples of suitable counter ions (in addition to anionic species generated during use) include chloride, bromide, sulfate, methylsulfate, sulfonate, methylsulfonate, carbonate, bicarbonate, formate, acetate, citrate, nitrate, and mixtures thereof.

Useful cationic polysaccharides, such as the branched cationic polysaccharides, such as the branched cationic starches, described herein may have at least one of a viscosity of less than about 1000 centipoise (cps), a charge density ranging from about 0.001 milliequivalents per gram (meq/g) of the polymer to about 5.0 meq/g of the polymer, and a weight average molecular weight ranging from about 500 Daltons to about 10,000,000 Daltons. In one embodiment, the deposition aid may be a cationic starch (such as Akzo, EXP 5617-2301-28 (National Starch 126290-82), available from National Starch, Bridgewater, N.J.) having a structure XI:

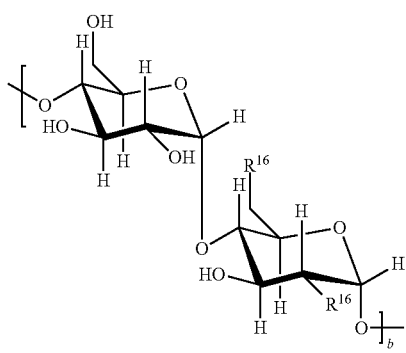

(XI)

where $R^{16}$ may be —OH or —(O)$_p$—(CH$_2$)$_n$(CH(OH))$_m$CH$_2$N$^+$(CH$_3$)$_3$ where p is 0 or 1, n is 1-10 and m is 0 or 1, provided that at least one $R^{16}$ group per substituted glucose unit is not —OH, and having a suitable counter anion, charge density of from about 0.35 meq/g to about 0.6 meq/g, an amylose content of about 28%, a water fluidity (WF) of from about 62 to about 70, and a molecular weight of from about 1,200,000 Daltons to about 3,000,000 Daltons. In one specific embodiment, the starch may be derived from maize, and modified with $R^{16}$ where —O—CH$_2$CH(OH)$_m$CH$_2$N$^+$(CH$_3$)$_3$, and the charge density may be about 0.42 meq/g, the molecular weight may be about 1,500,000 Daltons, and the amylose content may be about 28%.

As used herein, the charge density of the cationic or amphoteric polymers means the measurement of the charge of a polymer (measured in meq) per gram of the polymer and may be calculated, for example, by dividing the number of net charges per repeating unit by the molecular weight of the repeating unit. As recited above, in one embodiment, the charge density of the deposition aid may range from about 0.001 meq/g to about 5.0 meq/g of polymer. In another embodiment, the charge density of the deposition aid may range from about 0.1 meq/g to about 3.0 meq/g of polymer. According to the various embodiments, the charges, for example, the positive charges, may be located on the backbone of the polymer and/or on a side chain of the polymer.

Other embodiments of the branched cationic polysaccharides may have a weight average molecular weight ranging from about 50,000 Daltons to about 10,000,000 Daltons, or even from about 100,000 Daltons to about 5,000,000 Daltons. Certain embodiments of branched cationic celluloses (including cationic hydroxyethyl cellulose) may have a weight average molecular weight ranging from about 200,000 Daltons to about 3,000,000 Daltons and certain embodiments of the cationic guars may have a weight average molecular weight ranging from about 500,000 Daltons to about 2,000,000 Daltons.

Other branched cationic polymers can include branched cationic lignins and branched cationic synthetic polymers. Branched cationic lignins include lignin structures, such as, but not limited to lignin sulfonates, Kraft lignins, soda lignins, organosolv lignins, softwood lignin, hardwood lignin, steam explosion lignins, cellulosic grasses lignins, corn stover lignins, and combinations of any thereof, that have been modified to have cationic substituents, such as quaternary ammonium containing substituents. Modifying the lignin polymer may include, for example, substituting one or more of the hydroxyl groups on a lignin polymer backbone with one or more R substituent groups having a cationic charge, such as a quaternary ammonium charged group. In other embodiments, modifying the lignin polymer may include substituting at least one of the hydroxy, methoxy or aromatic carbons on the lignin polymer backbone with at least one R substituent group having a cationic charge.

The synthetic cationic or amphoteric oligomeric/polymeric deposition aids may be random, block or grafted copolymers and may be linear or branched. Certain embodiments of the synthetic oligomeric/polymeric deposition aid may have a weight average molecular weight ranging from about 2,000 Daltons to about 10,000,000 Daltons, or in specific embodiments from about 10,000, Daltons to about 3,000,000 Daltons or even ranging from about 500,000 Daltons to about 2,000,000 Daltons.

Specific embodiments of the fabric care compositions described herein may further comprise a surfactant quencher. Without intending to be limited by any theory, it is believed that certain surfactants may inhibit suitable and uniform deposition of at least one of the hydrophobic fluid and/or the particulate material onto the fabric or fiber surface. Therefore, excess or unintended surfactant in the composition or wash/rinse solution may be quenched or otherwise removed using the surfactant quencher. According to certain embodiments, the surfactant quencher may be present in from about 0.001% to about 5.0% by weight of the fabric care composition, or in other embodiments from about 0.05% to about 3.0%. The surfactant quencher according to various embodiments may have a solubility in the wash solution ranging from about 0.1% to about 40%. In other embodiments, the surfactant quencher may be a cationic surfactant quencher having a cationic charge ranging from about 0.1 milliequivalents/gram (meq/g) to about 23 meq/g. In further embodiments the surfactant quencher may have a molecular weight ranging from about 50 g/mole to about 1000 g/mole. In particular embodiments, the surfactant quencher may be coconut trimethyl ammonium chloride, dimethyl hydroxymethyl lauryl ammonium chloride, STEPANQUAT® 6585 (dipalmethyl hydroxyethylammonium methosulfate, lauryl trimethyl ammonium chloride or ditallow dimethyl ammonium chloride ("DTDMAC") and/or other cationic surfactants, including blends of the various surfactant quenchers.

Further embodiments of the fabric care compositions described herein may further comprise a dispersant. As used herein, a dispersant is a chemical compound or compounds that are used to stabilize an emulsion, dispersion or suspension of particles in a liquid. Suitable dispersants for use in the various embodiments described herein include non-ionic surfactants, polymeric surfactants, and silicone based dispersants. According to various embodiments, the dispersant may comprise from about 0.001% to 5% by weight of the composition; in certain embodiments from 0.05% to 2% by weight of the composition and in specific embodiments from 0.05%-0.5% by weight of the composition.

For example, suitable non-ionic surfactant include, but are not limited to, ethoxylated alcohols (aliphatic ethoxylate), polyethylene oxide (PEO) caprilic acid, PEO stearic acid, PEO oleic acid, PEO Lauric acid, nonionic hydroxylamines, ethoxylated alkylphenols, fatty esters, proxylated & ethoxylated fatty acids, alcohols, or alkyl phenols, fatty esters series, ethoxylated fatty acids, Ethoxylated fatty esters and oils, alkanolamides series, amine oxides series, ethoxylated amines and/or amides, POE stearic acid series, glycerol esters, glycol esters, ethoxylated oxazoline derivatives, monoglycerides and derivatives, lanolin based derivatives, amides, alkanolamides, amine oxides, hydrotropes, lecithin and Lecithin derivatives, phosphorous organic derivatives, sorbitan derivatives, protein based surfactants, allyl polyglycosides, thio and mercapto derivatives, imidazolines and imidazoline derivatives, cetearyl alcohols, emulsifying wax, octyl phenol ethoxylate, sucrose and glucose esters and derivatives, dipropyleneglycol isocetech-20 acetate, phosphate esters, organo-phosphate ester, propylene glycol mono- and diesters of fats ad fatty acids, mono- and diglycerides, partially hydrogenated vegetable oil with lecithin, BHT and citric acid, lauramine oxides, refined soya sterol, emulsified trichlorobenzene, emulsified aromatic and aliphatic solvents and esters, emulsified proprietary aromatic, fatty esters, modified ethoxylate, phenoxy compound, ethylene oxide condensate, polyglyceryl dimerate, lecithin and lecithin derivatives, pentaerythrityl tetracaprylate/tetracaprate, lauramide MEA, linoleamide DEA, coco imidazoline, imidazolines and imidazoline derivatives, carboxylated alcohol or alkylphenol ethoxylates, ethoxylated aryl phenols, and many others. Nonionic surfactants, such as Abex series from Rhodia Inc., Actrafos series from Georgia Pacific, Acconon series from Abitec Corporation, Adsee series from Witco Corp., Aldo series from Lonza Inc., Amidex series from Chemron Corp., Amodox series from Stepan Company, heterocyclic type products, and many other companies. Preferred nonionic surfactants are TAE 80 from BASF, Surforic L24-7 from BASF and some others.

Suitable polymeric dispersants include, but are not limited to, polyethylene glycols, PEO polymers, PEO ether, PEO/PPO block polymers, polyether, polyoxyalkylated alcohol, polyoxyethylene styrenated phenyl ether, block copolymer of alkoxylated glycols, polysaccharides, alkyl polyglycosides, PEG, PEG corn glycerides, PEG palm kernel glycerides, polyacrylic acid copolymers, polyacryamides, polymethyl acrylic acid, polyoxyalkylene ether, polyamides, polyproxylated & ethoxylated fatty acids, alcohols, or alkyl phenols, polycarboxylate polymers, any polymers comprising a hydrophilic side chain substituted polyimide or polyamide composition, any polymers having a hydrophilic groups, such as —COOH, a derivative of —COOH, sulfonic acid, a derivative of sulfonic acid, amine, and epoxy. Preferred polymeric surfactants are polyvinyl alcohols (PVOH), Polyvinyl pyrrolidone (PVP), and more.

Suitable silicone-based surfactants are dimethicone copolyols, polysiloxane polyether copolymer, cetyl dimethicone copolyol, polysiloxane polyalkyl polyether copolymers, silicone ethylene oxide copolymers, silicone glycol, cocamide DEA, silicone glycol copolymers, such as Abil B™ series, Abil EM™ series, Abil WE™ series from Goldschmodt AG, Silwet® series from Witco Corporation.

Adjunct Materials

Any number of additional ingredients can also be included as components in the various detergent and cleaning compositions described herein. These include other detergency builders, bleaches, bleach activators, suds boosters or suds suppressors, anti-tarnish and anti-corrosion agents, soil suspending agents, soil release agents, germicides, pH adjusting agents, non-builder alkalinity sources, chelating agents, smectite clays, enzymes, enzyme-stabilizing agents and perfumes. See U.S. Pat. No. 3,936,537.

Bleaching agents and activators are described in U.S. Pat. Nos. 4,412,934 and 4,483,781. Chelating agents are also described in U.S. Pat. No. 4,663,071 from column 17, line 54 through column 18, line 68. Suds modifiers are also optional ingredients and are described in U.S. Pat. Nos. 3,933,672 and 4,136,045. Suitable smectite clays for use herein are described in U.S. Pat. No. 4,762,645 column 6, line 3 through column 7, line 24. Suitable additional detergency builders for use herein are enumerated in U.S. Pat. No. 3,936,537 at column 13, line 54 through column 16, line 16, and in U.S. Pat. No. 4,663,071.

In yet another aspect of the present disclosure, the fabric care compositions disclosed herein, may take the form of rinse added fabric conditioning compositions. Such compositions may comprise a fabric softening active and the dispersant polymer of the present disclosure, to provide a stain repellency benefit to fabrics treated by the composition, typically from about 0.00001 wt. % (0.1 ppm) to about 1 wt. % (10,000 ppm), or even from about 0.0003 wt. % (3 ppm) to about 0.03 wt. % (300 ppm) based on total rinse added fabric conditioning composition weight. In another specific embodiment, the compositions are rinse added fabric conditioning compositions. Examples of typical rinse added conditioning composition can be found in U.S. Provisional Patent Application Ser. No. 60/687,582 filed on Oct. 8, 2004.

While not essential for the purposes of the present disclosure, the non-limiting list of adjuncts illustrated hereinafter are suitable for use in various embodiments of the cleaning compositions and may be desirably incorporated in certain embodiments of the disclosure, for example to assist or enhance performance, for treatment of the substrate to be cleaned, or to modify the aesthetics of the composition as is the case with perfumes, colorants, dyes or the like. It is understood that such adjuncts are in addition to the components that were previously listed for any particular embodiment. The total amount of such adjuncts may range from about 0.1% to about 50%, or even from about 1% to about 30%, by weight of the cleaning composition.

The precise nature of these additional components, and levels of incorporation thereof, will depend on the physical form of the composition and the nature of the operation for which it is to be used. Suitable adjunct materials include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282; 6,306,812; and 6,326,348.

As stated, the adjunct ingredients are not essential to the cleaning compositions. Thus, certain embodiments of the compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants—The compositions according to the present disclosure can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—The compositions of the present disclosure can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present disclosure may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole (PVPVI), polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present disclosure can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand ("MRL"). As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRLs herein are a special type of ultra-rigid ligand that is cross-bridged such as 5,12-diethyl-1,5,8,12-tetraazabicyclo[6.6.2]hexadecane. Suitable transition metal MRLs are readily prepared by known procedures, such as taught, for example, in WO 00/32601, and U.S. Pat. No. 6,225,464.

EXAMPLES

Example 1

Emulsion Mixtures

1. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 1000 mm$^2$/s at 25° C. [corresponds to Ia+Ib+II+III=230], functional radicals —$(CH_2)_3NH(CH_2)NH_2$ [corresponds to $R^2$], amine number of 0.6 mmol/g, 90 mol % SiMe$_3$ end groups, 10 mol % SiMe$_2$OH end groups [corresponds to II/III=9.0]) at 25° C. to obtain a clear, colorless solution having a viscosity of about 3000 mPa·s. This mixture is stable for a period of 3 months.

2. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 500 mm$^2$/s at 25° C. [corresponds to Ia+Ib+II+III=170], functional radicals —$(CH_2)_3NH(CH_2)NH_2$ [corresponds to $R^2$], amine number of 0.6 mmol/g, 68 mol % SiMe$_3$ end groups, 25 mol % SiMe$_2$OH end groups, 7 mol % SiMe$_2$OMe end groups [corresponds to II/III=2.1]) at 25° C. to obtain a clear, colourless solution having a viscosity of about 3000 mPa·s. This mixture is stable for a period of 3 months.

3. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 950 mm$^2$/s at 25° C. [corresponds to Ia+Ib+II+III=220], functional radicals —$(CH_2)_3NH(CH_2)NH_2$ [corresponds to $R^2$], amine number of 0.6 mmol/g, 92 mol % SiMe$_3$ end groups, 7 mol % SiMe$_2$OH end groups, 1 mol % SiMe$_2$OMe end groups [corresponds to II/III=11.5]) at 25° C. to obtain a clear, colourless solution having a viscosity of about 3000 mPa·s. This mixture is stable for a period of 3 months.

4. Preparation of a Stable Oil Mixture 13.2 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 2500 mm²/s at 25° C. [corresponds to Ia+Ib+II+III=315], functional radicals —$(CH_2)_3NH(CH_2)NH_2$ [corresponds to $R^2$], amine number of 0.8 mmol/g, 72 mol % $SiMe_3$ end groups, 26 mol % $SiMe_2OH$ end groups, 2 mol % $SiMe_2OMe$ end groups [corresponds to II/III=2.6]) at 25° C. to obtain a clear, colourless solution having a viscosity of about 3000 mPa·s. This mixture is stable for a period of 3 months.

5. Preparation of a Stable Oil Mixture 3.5 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are mixed for 30 minutes with 20.2 g of amine oil (viscosity about 225 mm²/s at 25° C. [corresponds to Ia+Ib+II+III=105], functional radicals —$(CH_2)_3NH(CH_2)NH_2$ [corresponds to $R^2$], amine number of 2.6 mmol/g, 94 mol % $SiMe_3$ end groups, 5 mol % $SiMe_2OH$ end groups, 1 mol % $SiMe_2OMe$ end groups [corresponds to II/III=15.7]).

6. Preparation of a Stable Oil Mixture 3.5 g of DT silicone resin solution ($\{[Me_2SiO]_{0.03}[MeSiO_{3/2}]_{0.97}\}_{33}$, Mn=2300 g/mol, resin contains appr. 0.4% OH and 4.4% OEt [corresponds to $R^{10}$], 25% in Shellsol T) are dissolved in 3.6 g ethylene glycol monohexyl ether (obtainable from Sigma-Aldrich Chemie GmbH) by stirring and subsequently admixed with 14.2 g of amine oil (viscosity about 1000 mm²/s at 25° C. [corresponds to Ia+Ib+II+III=230], functional radicals —$(CH_2)_3NH(CH_2)NH_2$ [corresponds to $R^2$], amine number of 0.6 mmol/g, 90 mol % $SiMe_3$ end groups, 10 mol % $SiMe_2OH$ end groups [corresponds to II/III=9.0]) at 25° C. to obtain a clear, colourless solution having a viscosity of about 3000 mPa·s. This mixture is stable for a period of 3 months.

7. Preparation of an Unstable Oil Mixture 13.2 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 2800 mm²/s at 25° C. [corresponds to Ia+Ib+II+III=325], functional radicals —$(CH_2)_3NH(CH_2)NH_2$ [corresponds to $R^2$], amine number of 0.6 mmol/g, 47 mol % $SiMe_3$ end groups, 45 mol % $SiMe_2OH$ end groups, 8 mol % $SiMe_2OMe$ end groups [corresponds to II/III=0.9]) at 25° C. to obtain a clear, colorless solution having a viscosity of about 3000 mPa·s. This mixture has formed a gel after 3 days; the preparation of an emulsion is only possible within these three days.

8. Preparation of an Unstable Oil Mixture 13.2 g of MQ silicone resin ($\{[Me_3SiO_{1/2}]_{0.373}[SiO_2]_{0.627}\}_{40}$, Mn=2700 g/mol, resin contains appr. 0.2% OH and 3.1% OEt [corresponds to $R^{10}$]) are dissolved in 10.5 g of ethylene glycol monohexyl ether (obtainable from Sigma-Aldrich Chemie GmbH) by stirring and subsequently admixed with 76.3 g of amine oil (viscosity about 2900 mm²/s at 25° C. [corresponds to Ia+Ib+II+III=331], functional radicals —$(CH_2)_3NH(CH_2)NH_2$ [corresponds to $R^2$], amine number of 0.4 mmol/g, 47 mol % $SiMe_3$ end groups, 47 mol % $SiMe_2OH$ end groups, 6 mol % $SiMe_2OMe$ end groups [corresponds to II/III=0.9]) at 25° C. to obtain a clear, colorless solution having a viscosity of about 3000 mPa·s. This mixture has formed a gel after 3 days; the preparation of an emulsion is only possible within these three days.

Preparation of Emulsions

General Prescription for the Emulsification of the Oil Mixtures 1 to 8: (Emulsion 1-8)

8.0 g of demineralized water, 12.0 g of diethylene glycol monobutyl ether (obtainable from Sigma-Aldrich Chemie GmbH), 1.5 g of diethylene glycol monohexyl ether (obtainable from Sigma-Aldrich Chemie GmbH) and acetic acid 100% (equimolar to the amine groups of the aminoalkyl-containing polyorganosiloxanes, obtainable from VWR International) are initially charged and mixed at room temperature, then 39.0 g of the above-described oil mixture are added at room temperature and subsequently a further 46.5 g of demineralized water are added with stirring to obtain an almost clear, colorless emulsion. Oil mixtures 5 and 6 were emulsified immediately after their preparation.

General Prescription for the Emulsification of the Oil Mixtures 1 and 2 in Presence of Polyvinyl Alcohol (Emulsion 9-10):

17 g polyvinyl alcohol "Celvol 523®" (obtainable from Sekisui Specialty Chemicals America), 10% in water (obtainable from Wacker Chemie AG), 23 g polyvinyl alcohol M05/140 M, 20% in water (obtainable from Wacker Chemie AG) and 4.0 g diethylenglykol monohexylether (obtainable from Sigma-Aldrich Chemie GmbH) are initially charged and mixed at room temperature, then 39.0 g of the above-described oil mixture are added at room temperature and subsequently 29.0 g of demineralized water are added with stirring to obtain an opaque, colorless emulsion.

Example 2

Application Examples

2-A. The mixtures prepared (Oil mixtures) above were for applications testing. The said oil mixture was diluted with isopropyl alcohol to a solids content of 2%. The solutions were sprayed onto cotton fabrics and the fabrics were line dried. After drying, time to wick was measured on all fabrics according to the Time to Wick (T2W) testing method protocol described below.

|  | Water T2W |
| --- | --- |
| Untreated | 0 second |
| Example 2-A-Oil mixture 1 | >20 minute |
| Example 2-A-Oil mixture 2 | >20 minute |
| Example 2-A-Oil mixture 3 | >20 minute |
| Example 2-A-Oil mixture 4 | >20 minute |
| Example 2-A-Oil mixture 5 | >20 minute |
| Example 2-A-Oil mixture 6 | >20 minute |
| Example 2-A-Oil mixture 7* | Not applicable (unstable) |
| Example 2-A-Oil mixture 8* | Not applicable (unstable) |

2-B. The above emulsion mixtures (Emulsion) were diluted into 2% solution with water. Cotton fabric was dipped in the solution and then line dried. The time to wick was measured on the fabrics according to the T2W testing method.

|  | Water T2W |
| --- | --- |
| Untreated | 0 second |
| Example 2-B-Emulsion 1 | >20 minute |
| Example 2-B-Emulsion 2 | >20 minute |
| Example 2-B-Emulsion 3 | >20 minute |
| Example 2-B-Emulsion 4 | >20 minute |
| Example 2-B-Emulsion 5 | >20 minute |
| Example 2-B-Emulsion 6 | >20 minute |
| Example 2-B-Emulsion 7* | Not applicable (unstable) |
| Example 2-B-Emulsion 8* | Not applicable (unstable) |
| Example 2-B-Emulsion 9 | >20 minutes |
| Example 2-B-Emulsion 10 | >20 minutes |

According to certain embodiments, the polyorganosiloxane-silicone resin mixture of the present disclosure may also be incorporated into any surface treatment or cleaning composition, such as, but not limited to, a fabric care composition, a dish cleaning composition, a home surface care composition or a personal care composition. Examples of treatment and cleaning compositions include, but are not limited to, liquid laundry detergents, solid laundry detergents, laundry soap products, laundry spray treatment products, laundry pretreatment products, hand dish washing detergents, automatic dishwashing detergents, a beauty care detergent, hard surface cleaning detergents, carpet cleaning detergents, a shampoo, and a household cleaning detergent. Examples of fabric care compositions suitable for the present disclosure include, but are not limited to, liquid laundry detergents, heavy duty liquid laundry detergents, solid laundry detergents, laundry soap products, laundry spray treatment products, laundry pretreatment products, laundry soak products, heavy duty liquid detergents, and rinse additives. Examples of suitable dish cleaning compositions include, but are not limited to, automatic dishwasher detergents, detergents for hand washing of dishes, liquid dish soap, and solid granular dish soap. Examples of suitable home care compositions include, but are not limited to, rug or carpet cleaning compositions, hard surface cleaning detergents, floor cleaning compositions, window cleaning compositions, household cleaning detergents, and car washing detergents. Examples of suitable personal care compositions include, but are not limited to, beauty care detergents, beauty bars, bar soap, bath beads, bath soaps, hand washing compositions, body washes and soaps, shampoo, conditioners, cosmetics, hair removal compositions, and oral care compositions.

Example 3

Liquid Laundry Additive Compositions

The above emulsions 1-10 were then made into products with the following formulation. The formulated products were used in the rinse cycle in the washing machine loaded with cotton garments. Normal wash conditions were used and Tide detergent was used in the wash cycle.

| Formula (w/w active %) | |
| --- | --- |
| Si Fluid-Resin Emulsion of Example 1-10 | 10.67 |
| Cationic Starch (Maize, MW 1,500,000 Daltons, charge density 0.42 meq/g, amylase 28%) | 0.72 |
| DTDMAC | 1.33 |
| Perfume: | 0.20 |
| Preservant: Proxel | 0.015 |

Cotton fabric was dipped in the solution and then line dried. The time to wick was measured on the fabrics according to the T2W testing method.

|  | Water T2W |
| --- | --- |
| Untreated | 0 second |
| Product/Example 3.1-Emulsion 1 | 977 second |
| Product/Example 3.2-Emulsion 2 | 1200 second |
| Product/Example 3.3-Emulsion 3 | 1200 second |
| Product/Example 3.4-Emulsion 4 | 12 second |
| Product/Example 3.5-Emulsion 5 | 287 second |
| Product/Example 3.6-Emulsion 6 | 191 second |
| Product/Example 3.7-Emulsion 7* | Not applicable (unstable) |
| Product/Example 3.8-Emulsion 8* | Not applicable (unstable) |
| Product/Example 3.9-Emulsion 9 | 680 second |
| Product/Example 3.10-Emulsion 10 | 887 second |

Liquid laundry additive compositions A-I detailed below have detailed percentages based on 100% active basis.

|  | Ingredient | | | | | | | | |
| --- | --- | --- | --- | --- | --- | --- | --- | --- | --- |
|  | A | B | C | D | E | F | G | H | I |
| Dosage | 30 g | 30 g | 30 g | 30 g | 30 g | 30 g | 30 g | 30 g | 30 g |
| Wacker HC306 | 6.00% | 6.00% | 6.00% | 6.00% | 6.00% | 12.00% | 12.00% | 12.00% | 12.00% |
| Akzo Nobel EXP5617 | 1.20% | 1.20% | 1.20% | 1.20% | 1.20% | 1.20% | 1.20% | 1.20% | 1.20% |
| TAE80 | 0.25% | 0.25% | 0.25% | 0.25% | 0.25% | 0.25% | 0.25% | 0.25% | 0.25% |
| Proxel GXL | 0.02% | 0.02% | 0.02% | 0.02% | 0.02% | 0.02% | 0.02% | 0.02% | 0.02% |
| Best B perfume | 0.40% | 0.40% | 0.40% | 0.40% | 0.40% | 0.40% | 0.40% | 0.40% | 0.40% |
| Butyl Carbitol | 3.00% | 3.00% | 3.00% | 3.00% | 3.00% | 2.00% | 2.00% | 2.00% | 2.00% |
| Polyamine N-oxide | 0.00% | 0.83% | 1.67% | 3.34% | 5.00% | 0.00% | 1.67% | 3.34% | 5.00% |
| T2W (sec.) | 7 | 14 | 37 | 73 | 78 | 15 | 75 | 149 | 282 |

Example 4

Liquid Detergent Compositions

The treatment or cleaning compositions herein, such as, but not limited to liquid detergent compositions, may take the form of an aqueous solution or uniform dispersion or suspension of surfactant and water, aqueous polyorganosiloxane-silicone resin mixture, and certain optional adjunct ingredients, some of which may normally be in solid form, that have been combined with the normally liquid components of the composition. Suitable surfactants may be anionic, nonionic, cationic, zwitterionic and/or amphoteric surfactants. In one embodiment, the cleaning composition comprises anionic surfactant, nonionic surfactant, or mixtures thereof.

Suitable anionic surfactants may be any of the conventional anionic surfactant types typically used in cleaning compositions, such as liquid or solid detergent products. Such surfactants include the alkyl benzene sulfonic acids and their salts as well as alkoxylated or non-alkoxylated alkyl sulfate materials. Exemplary anionic surfactants are the alkali metal salts of $C_{10}$-$C_{16}$ alkyl benzene sulfonic acids, preferably $C_{11}$-$C_{14}$ alkyl benzene sulfonic acids. In one aspect, the alkyl group is linear. Such linear alkyl benzene sulfonates are known as "LAS". Such surfactants and their preparation are described for example in U.S. Pat. Nos. 2,220,099 and 2,477,383. Especially preferred are the sodium and potassium linear straight chain alkylbenzene sulfonates in which the average number of carbon atoms in the alkyl group is from about 11 to 14. Sodium $C_{11}$-$C_{14}$, e.g., $C_{12}$ LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is a $C_{12}$-$C_{16}$, n is from about 1 to 6, and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the cleaning compositions of this disclosure and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $R''OSO_3^-M^+$ wherein R'' is typically a linear $C_8$-$C_{20}$ hydrocarbyl group, which may be straight chain or branched chain, and M is a water-solubilizing cation. In specific embodiments, R'' is a $C_{10}$-$C_{15}$ alkyl, and M is alkali metal, more specifically R'' is $C_{12}$-$C_{14}$ and M is sodium.

Specific, nonlimiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3)-alkyl sulfates having Formulae (XII) and (XIII):

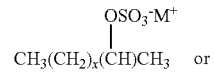

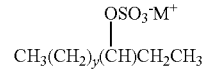

wherein M in Formulae (XII) and (XIII) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of preferred cations including sodium, potassium, ammonium, and mixtures thereof, and x in Formula XII is an integer of at least about 7, preferably at least about 9, and y in Formula XIII is an integer of at least 8, preferably at least about 9; d) $C_{10}$-$C_{18}$ alkyl alkoxy sulfates ($AE_xS$) wherein preferably x in Formula XII is from 1-30; e) $C_{10}$-$C_{18}$ alkyl alkoxy carboxylates preferably comprising 1-5 ethoxy units; f) mid-chain branched alkyl sulfates as discussed in U.S. Pat. Nos. 6,020, 303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. Preferred for use in the liquid detergent products herein are those nonionic surfactants which are normally liquid. Suitable nonionic surfactants for use herein include the alcohol alkoxylate nonionic surfactants. Alcohol alkoxylates are materials which correspond to the general formula: $R^7(C_mH_{2m}O)_nOH$ wherein $R^7$ is a $C_8$-$C_{16}$ alkyl group, m is from 2 to 4, and n ranges from about 2 to 12. Preferably $R^7$ is an alkyl group, which may be primary or secondary, that contains from about 9 to 15 carbon atoms, more preferably from about 10 to 14 carbon atoms. In one embodiment, the alkoxylated fatty alcohols will also be ethoxylated materials that contain from about 2 to 12 ethylene oxide moieties per molecule, more preferably from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17. More preferably, the HLB of this material will range from about 6 to 15, most preferably from about 8 to 15. Alkoxylated fatty alcohol nonionic surfactants have been marketed under the tradename NEODOL® by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R'''(EO)_x(PO)_y(BO)_zN(O)(CH_2R')_2 \cdot qH_2O$. In this formula, R''' is a relatively long-chain hydrocarbyl moiety which can be saturated or unsaturated, linear or branched, and can contain from 8 to 20, preferably from 10 to 16 carbon atoms, and is more preferably $C_{12}$-$C_{16}$ primary alkyl. R' is a short-chain moiety, preferably selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12}$-$C_{14}$ alkyldimethyl amine oxide.

Non-limiting examples of nonionic surfactants include: a) $C_{12}$-$C_{18}$ alkyl ethoxylates, such as, NEODOL® nonionic surfactants; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as PLURONIC® from BASF; d) $C_{14}$-$C_{22}$ midchain branched alcohols, BA, as discussed in U.S. Pat. No. 6,150,322; e) $C_{14}$-$C_{22}$ mid-chain branched alkyl alkoxylates, $BAE_R$, wherein x is 1-30, as discussed in U.S. Pat. Nos. 6,153,577; 6,020,303; and 6,093,856; f) alkylpolysaccharides as discussed in U.S. Pat. No. 4,565,647; specifically alkylpolyglycosides as discussed in U.S. Pat. Nos. 4,483,780 and 4,483,779; g) polyhydroxy fatty acid amides as discussed in U.S. Pat. No. 5,332,528; WO 92/06162; WO 93/19146; WO 93/19038; and WO 94/09099; and h) ether capped poly (oxyalkylated) alcohol surfactants as discussed in U.S. Pat. No. 6,482,994 and WO 01/42408.

In the laundry detergent compositions and other cleaning compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002; WO 98/35003; WO 98/35004; WO 98/35005; and WO 98/35006; d) cationic ester surfactants as discussed in U.S. Pat. Nos. 4,228,042; 4,239,660; 4,260,529; and 6,022,844; and e) amino surfactants as discussed in U.S. Pat. No. 6,221,825 and WO 00/47708, specifically amido propyldimethyl amine (APA).

Non-limiting examples of zwitterionic surfactants include: derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 at column 19, line 38 through column 22, line 48, for examples of zwitterionic surfactants; betaine, including alkyl dimethyl betaine and cocodimethyl amidopropyl betaine, $C_8$-$C_{18}$ (preferably $C_{12}$-$C_{18}$) amine oxides and sulfo and hydroxy betaines, such as N-alkyl-N,N-dimethylammino-1-propane sulfonate where the alkyl group can be $C_8$-$C_{18}$, preferably $C_{10}$-$C_{14}$.

Non-limiting examples of ampholytic surfactants include: aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678 at column 19, lines 18-35, for examples of ampholytic surfactants.

The cleaning compositions disclosed herein may be prepared by combining the components thereof in any convenient order and by mixing, e.g., agitating, the resulting component combination to form a phase stable cleaning composition. In one aspect, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactant and the solid ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills are incorporated. As a variation of the composition preparation procedure described above, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In another aspect of producing liquid cleaning compositions, the aqueous polyorganosiloxane-silicone resin mixture may first be combined with one or more liquid components to form an aqueous polyorganosiloxane-silicone resin mixture premix, and this aqueous polyorganosiloxane-silicone resin mixture premix is added to a composition formulation containing a substantial portion, for example more than 50% by weight, more than 70% by weight, or even more than 90% by weight, of the balance of components of the cleaning composition. For example, in the methodology described above, both the aqueous polyorganosiloxane-silicone resin premix and the enzyme component are added at a final stage of component additions. In another aspect, the aqueous polyorganosiloxane-silicone resin mixture is encapsulated prior to addition to the detergent composition, the encapsulated aqueous polyorganosiloxane-silicone resin mixture is suspended in a structured liquid, and the suspension is added to a composition formulation containing a substantial portion of the balance of components of the cleaning composition.

Heavy Duty Liquid Laundry Detergent Formulations

In this Example, three sample formulations for a heavy duty liquid (HDL) laundry detergent are prepared using the aqueous polyorganosiloxane-silicone resin mixture according to embodiments of the present disclosure. The aqueous polyorganosiloxane-silicone resin mixture is added to the formulations in an amount ranging from 0.5% to 10.0% by weight.

| Ingredient | A Wt % | B Wt % | C Wt % | D Wt % | E Wt % |
|---|---|---|---|---|---|
| Sodium alkyl ether sulfate | 20.5 | 20.5 | 20.5 | | |
| C12-15 Alkyl Polyethoxylate (1.1) Sulfonic Acid | | | | 9.0 | |
| Branched alcohol sulfate | 5.8 | 5.8 | 5.8 | | |
| Linear alkylbenzene sulfonic acid | 2.5 | 2.5 | 2.5 | 1.0 | 8.0 |
| Alkyl ethoxylate | 0.8 | 0.8 | 0.8 | 1.5 | 6.0 |
| Amine oxide | 0 | 0.5 | 2 | | 1.0 |
| Citric acid | 3.5 | 3.5 | 3.5 | 2.0 | 2.5 |
| Fatty acid | 2.0 | 2.0 | 2.0 | | 5.5 |

-continued

| Ingredient | A Wt % | B Wt % | C Wt % | D Wt % | E Wt % |
|---|---|---|---|---|---|
| Protease | 0.7 | 0.7 | 0.7 | 0.4 | 0.4 |
| Amylase | 0.37 | 0.37 | 0.37 | 0.08 | 0.08 |
| Mannanase | | | | 0.03 | 0.03 |
| Borax (38%) | 3.0 | 3.0 | 3.0 | 1.0 | |
| MEA Borate | | | | | 1.5 |
| Calcium and sodium formate | 0.22 | 0.22 | 0.22 | 0.7 | |
| Amine ethoxylate polymers | 1.2 | 0.5 | 1.0 | 1.0 | 1.5 |
| Zwitterionic amine ethoxylate polymer | 1.0 | 2.0 | 1.0 | | |
| Polyorgano siloxane Fluid-Silicone Resin Emulsion[1] | 0.5 | 1.0 | 2.0 | 1.0 | 1.0 |
| DTPA[2] | 0.25 | 0.25 | 0.25 | 0.3 | 0.3 |
| Fluorescent whitening agent | 0.2 | 0.2 | 0.2 | | |
| Ethanol | 2.9 | 2.9 | 2.9 | 1.5 | 1.5 |
| Propylene Glycol | | | | 3.0 | 5.0 |
| Propanediol | 5.0 | 5.0 | 5.0 | | |
| Diethylene glycol | 2.56 | 2.56 | 2.56 | | |
| Polyethylene glycol 4000 | 0.11 | 0.11 | 0.11 | | |
| Monoethanolamine | 2.7 | 2.7 | 2.7 | 1.0 | 0.5 |
| Sodium hydroxide (50%) | 3.67 | 3.67 | 3.67 | 1.4 | 1.4 |
| Sodium cumene sulfonate | 0 | 0.5 | 1 | | 0.7 |
| Silicone suds suppressor | 0.01 | 0.01 | 0.01 | | 0.02 |
| Perfume | 0.5 | 0.5 | 0.5 | 0.30 | 0.3 |
| Dye | 0.01 | 0.01 | 0.01 | 0.016 | 0.016 |
| Opacifier[3] | 0.01 | 0.01 | 0.01 | | |
| Water | balance | balance | balance | balance | balance |
| | 100.0% | 100.0% | 100.0% | 100.0% | 100.0% |

[1]Polyorganosiloxane Fluid-Silicone Resin Emulsion or Example 1
[2]Diethylenetriaminepentaacetic acid, sodium salt
[3]Acusol OP 301

Example 5

Granular Laundry Detergent Compositions

In another aspect of the present disclosure, the fabric care compositions disclosed herein, may take the form of granular laundry detergent compositions. Such compositions comprise the dispersant polymer of the present disclosure to provide soil and stain removal and anti-redeposition, suds boosting, and/or soil release benefits to fabric washed in a solution containing the detergent. Typically, the granular laundry detergent compositions are used in washing solutions at a level of from about 0.0001% to about 0.05%, or even from about 0.001% to about 0.01% by weight of the washing solution.

Detergent compositions may be in the form of a granule. Typical components of granular detergent compositions include but are not limited to surfactants, builders, bleaches, bleach activators and/or other bleach catalysts and/or boosters, enzymes, enzyme stabilizing agents, soil suspending agents, soil release agents, pH adjusting agents and/or other electrolytes, suds boosters or suds suppressers, anti-tarnish and anticorrosion agents, non-builder alkalinity sources, chelating agents, organic and inorganic fillers, solvents, hydrotropes, clays, silicones, flocculant, dye transfer inhibitors, photobleaches, fabric integrity agents, effervesence-generating agents, processing aids (non-limiting examples of which include binders and hydrotropes), germicides, brighteners, dyes, and perfumes. Granular detergent compositions typically comprise from about 1% to 95% by weight of a surfactant. Detersive surfactants utilized can be of the anionic, nonionic, cationic, zwitterionic, ampholytic, amphoteric, or catanionic type or can comprise compatible mixtures of these types.

Granular detergents can be made by a wide variety of processes, non-limiting examples of which include spray drying, agglomeration, fluid bed granulation, marumarisation, extrusion, or a combination thereof. Bulk densities of granular detergents generally range from about 300 g/l-1000 g/l. The average particle size distribution of granular detergents generally ranges from about 250 microns-1400 microns.

Granular detergent compositions of the present disclosure may include any number of conventional detergent ingredients. For example, the surfactant system of the detergent composition may include anionic, nonionic, zwitterionic, ampholytic and cationic classes and compatible mixtures thereof. Detergent surfactants for granular compositions are described in U.S. Pat. Nos. 3,664,961 and 3,919,678. Cationic surfactants include those described in U.S. Pat. Nos. 4,222,905 and 4,239,659.

Non-limiting examples of surfactant systems include the conventional $C_{11}$-$C_{18}$ alkyl benzene sulfonates ("LAS") and primary, branched-chain and random $C_{10}$-$C_{20}$ alkyl sulfates ("AS"), the $C_{10}$-$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$-$C_{18}$ alkyl alkoxy sulfates ("AE$_x$S"; especially EO 1-7 ethoxy sulfates), $C_{10}$-$C_{18}$ alkyl alkoxy carboxylates (especially the EO 1-5 ethoxycarboxylates), the $C_{10}$-$C_{18}$ glycerol ethers, the $C_{10}$-$C_{18}$ alkyl polyglycosides and their corresponding sulfated polyglycosides, and $C_{12}$-$C_{18}$ alpha-sulfonated fatty acid esters. If desired, the conventional nonionic and amphoteric surfactants such as the $C_{12}$-$C_{18}$ alkyl ethoxylates ("AE") including the so-called narrow peaked alkyl ethoxylates and $C_6$-$C_{12}$ alkyl phenol alkoxylates (especially ethoxylates and mixed ethoxy/propoxy), $C_{12}$-$C_{18}$ betaines and sulfobetaines ("sultaines"), $C_{10}$-$C_{18}$ amine oxides, and the like, can also be included in the surfactant system. The $C_{10}$-$C_{18}$ N-alkyl polyhydroxy fatty acid amides can also be used. See WO 92/06154. Other sugar-derived surfactants include the N-alkoxy polyhydroxy fatty acid amides, such as $C_{10}$-$C_{18}$ N-(3-methoxypropyl) glucamide. The N-propyl through N-hexyl $C_{12}$-$C_{18}$ glucamides can be used for low sudsing. $C_{10}$-$C_{20}$ conventional soaps may also be used. If high sudsing is desired, the branched-chain $C_{10}$-$C_{16}$ soaps may be used. Mixtures of anionic and nonionic surfactants are especially useful. Other conventional useful surfactants are listed in standard texts.

The cleaning composition can, and in certain embodiments preferably does, include a detergent builder. Builders are generally selected from the various water-soluble, alkali metal, ammonium or substituted ammonium phosphates, polyphosphates, phosphonates, polyphosphonates, carbonates, silicates, borates, polyhydroxy sulfonates, polyacetates, carboxylates, and polycarboxylates. Preferred are the alkali metals, especially sodium, salts of the above. Preferred for use herein are the phosphates, carbonates, silicates, $C_{10}$-$C_{18}$ fatty acids, polycarboxylates, and mixtures thereof. More preferred are sodium tripolyphosphate, tetrasodium pyrophosphate, citrate, tartrate mono- and di-succinates, sodium silicate, and mixtures thereof.

Specific examples of inorganic phosphate builders are sodium and potassium tripolyphosphate, pyrophosphate, polymeric metaphosphate having a degree of polymerization of from about 6 to 21, and orthophosphates. Examples of polyphosphonate builders are the sodium and potassium salts of ethylene diphosphonic acid, the sodium and potassium salts of ethane 1-hydroxy-1,1-diphosphonic acid and the sodium and potassium salts of ethane-1,1,2-triphosphonic acid. Other phosphorus builder compounds are disclosed in U.S. Pat. Nos. 3,159,581; 3,213,030; 3,422,021; 3,422,137; 3,400,176; and 3,400,148. Examples of non-phosphorus, inorganic builders are sodium and potassium carbonate, bicarbonate, sesquicarbonate, tetraborate decahydrate, and silicates having a weight ratio of $SiO_2$ to alkali metal oxide of from about 0.5 to about 4.0, preferably from about 1.0 to about 2.4. Water-soluble, non-phosphorus organic builders useful herein include the various alkali metal, ammonium and substituted ammonium polyacetates, carboxylates, polycarboxylates and polyhydroxy sulfonates. Examples of polyacetate and polycarboxylate builders are the sodium, potassium, lithium, ammonium and substituted ammonium salts of ethylene diamine tetraacetic acid, nitrilotriacetic acid, oxydisuccinic acid, mellitic acid, benzene polycarboxylic acids, and citric acid.

Polymeric polycarboxylate builders are set forth in U.S. Pat. No. 3,308,067. Such materials include the water-soluble salts of homo- and copolymers of aliphatic carboxylic acids such as maleic acid, itaconic acid, mesaconic acid, fumaric acid, aconitic acid, citraconic acid and methylenemalonic acid. Some of these materials are useful as the water-soluble anionic polymer as hereinafter described, but only if in intimate admixture with the non-soap anionic surfactant. Other suitable polycarboxylates for use herein are the polyacetal carboxylates described in U.S. Pat. Nos. 4,144,226 and 4,246,495.

Water-soluble silicate solids represented by the formula $SiO_2 \cdot M_2O$, M being an alkali metal, and having a $SiO_2:M_2O$ weight ratio of from about 0.5 to about 4.0, are useful salts in the detergent granules of this disclosure at levels of from about 2% to about 15% on an anhydrous weight basis. Anhydrous or hydrated particulate silicate can be utilized, as well.

Various techniques for forming cleaning compositions in such solid forms are well known in the art and may be used herein. In one aspect, when the cleaning composition, such as a fabric care composition, is in the form of a granular particle, the aqueous polyorganosiloxane-silicone resin mixture is provided in particulate form, optionally including additional but not all components of the cleaning composition. The aqueous polyorganosiloxane-silicone resin mixture particulate is combined with one or more additional particulates containing a balance of components of the cleaning composition. Further, the aqueous polyorganosiloxane-silicone resin mixture, optionally including additional but not all components of the cleaning composition may be provided in an encapsulated form, and the aqueous polyorganosiloxane-silicone resin mixture encapsulate is combined with particulates containing a substantial balance of components of the cleaning composition.

Powder Laundry Detergent Formulations

In this Example, four sample formulations for a powder laundry detergent are prepared using the polysiloxane-silicone resin mixture according to embodiments of the present disclosure. The aqueous polyorganosiloxane-silicone resin mixture is added to the formulations in an amount ranging from 1.0% to 10.0% by weight.

| Ingredients | A Wt. % | B Wt. % | C Wt. % | D Wt. % |
| --- | --- | --- | --- | --- |
| Sodium alkylbenzenesulfonate | 16.0000 | 14.0000 | 12.0000 | 7.9 |
| Sodium alkyl alcohol ethoxylate (3) sulfate | — | — | — | 4.73 |
| Sodium mid-cut alkyl sulfate | — | 1.5000 | 1.5000 | — |
| Alkyl dimethyl hydroxyethyl quaternary amine (chloride) | — | — | — | 0.5 |
| Alkyl ethoxylate | 1.3000 | 1.3000 | 1.3000 | — |
| Polyamine[1] | — | — | — | 0.79 |
| Nonionic Polymer[2] | 1.0000 | 1.0000 | 1.0000 | 1.0 |
| Carboxymethylcellulose | 0.2000 | 0.2000 | 0.2000 | 1.0 |
| Sodium polyacrylate | — | — | — | — |
| Sodium polyacrylate/maleate polymer | 0.7000 | 0.7000 | 0.7000 | 3.5 |
| Polyorganosiloxane Fluid-Silicone Resin Emulsion[3] | 1.0000 | 1.0000 | 1.0000 | 3.0000 |
| Sodium tripolyphosphate | 10.0000 | 5.0000 | — | — |
| Zeolite | 16.0000 | 16.0000 | 16.0000 | — |
| Citric Acid | — | — | — | 5.0 |
| Sodium Carbonate | 12.5000 | 12.5000 | 12.5000 | 25.0 |
| Sodium Silicate | 4.0 | 4.0 | 4.0 | — |
| Enzymes[4] | 0.30 | 0.30 | 0.30 | 0.5 |
| Minors including moisture[5] | balance | balance | balance | balance |

[1]Hexamethylenediamine ethoxylated to 24 units for each hydrogen atom bonded to a nitrogen, quaternized.
[2]Comb polymer of polyethylene glycol and polyvinylacetate
[3]Polyorganosiloxane Fluid-Silicone Resin Emulsion of Example 1
[4]Enzyme cocktail selected from known detergent enzymes including amylase, cellulase, protease, and lipase.
[5]Balance to 100% can, for example, include minors like optical brightener, perfume, suds suppresser, soil dispersant, soil release polymer, chelating agents, bleach additives and boosters, dye transfer inhibiting agents, aesthetic enhancers (example: Speckles), additional water, and fillers, including sulfate, $CaCO_3$, talc, silicates, etc.

Example 6

Automatic Dishwasher Detergent Formulation

In this Example, five sample formulations for an automatic dishwasher detergent are prepared using the aqueous polyorganosiloxane-silicone resin mixture according to embodiments of the present disclosure. The aqueous polyorganosiloxane-silicone resin mixture is added to the formulations in an amount ranging from 0.05% to 15% by weight.

| Ingredients | A Wt. % | B Wt. % | C Wt. % | D Wt. % | E Wt. % |
| --- | --- | --- | --- | --- | --- |
| Polymer dispersant[1] | 0.5 | 5 | 6 | 5 | 5 |
| Carbonate | 35 | 40 | 40 | 35-40 | 35-40 |
| Sodium tripolyphosphate | 0 | 6 | 10 | 0-10 | 0-10 |
| Silicate solids | 6 | 6 | 6 | 6 | 6 |
| Bleach and Bleach activators | 4 | 4 | 4 | 4 | 4 |
| Enzymes | 0.3-0.6 | 0.3-0.6 | 0.3-0.6 | 0.3-0.6 | 0.3-0.6 |
| Disodium citrate dihydrate | 0 | 0 | 0 | 2-20 | 0 |
| Nonionic surfactant[2] | 0 | 0 | 0 | 0 | 0.8-5 |

-continued

| Ingredients | A Wt. % | B Wt. % | C Wt. % | D Wt. % | E Wt. % |
|---|---|---|---|---|---|
| Polyorganosiloxane Fluid-Silicone Resin Emulsion[3] | 0.05-15 | 0.05-15 | 0.05-15 | 0.05-15 | 0.05-15 |
| Water, sulfate, perfume, dyes and other adjuncts | Balance to 100% | Balance to 100% | Balance to 100% | Balance to 100% | Balance to 100% |

[1]Anionic polymers such as Acusol, Alcosperse and other modified polyacrylic acid polymers.
[2]Such as SLF-18 polytergent from Olin Corporation
[3]Polyorganosiloxane Fluid-Silicone Resin Emulsion of Example 1

Example 7

Liquid Dishwashing Liquid

Liquid Dish Handwashing Detergents

| Composition | A | B |
|---|---|---|
| $C_{12-13}$ Natural AE0.6S | 270 | 240 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[1] | 2.0 | 2.0 |
| Ethanol | 4.5 | 4.5 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[2] | 0.5 | 0.5 |
| Polyorganosiloxane Fluid-Silicone Resin Emulsion[3] | 0.05-15 | 0.05-15 |
| Water | Balance | Balance |

[1]Nonionic may be either $C_{11}$ Alkyl ethoxylated surfactant containing 9 ethoxy groups.
[2]1,3, BAC is 1,3 bis(methylamine)-cyclohexane.
[3]Polyorganosiloxane Fluid-Silicone Resin Emulsion of Example 1

Example 8

Unit Dose

The detergent product of the present invention may comprise a water-soluble pouch, more preferably a multi-compartment water-soluble pouch. Such a pouch comprises a water-soluble film and at least a first, and optionally a second compartment. The first compartment comprises a first composition, comprising an opacifier and an antioxidant. The second compartment comprises a second compartment. Preferably the pouch comprises a third compartment and a third composition. The optionally second and third compositions are preferably visibly distinct from each other and the first composition.

Optionally, a difference in aesthetic appearance may be achieved in a number of ways. However the first compartment of the pouch may comprise an opaque liquid composition. The compartments of the pouch may be the same size or volume. Alternatively, the compartments of the pouch may have different sizes, with different internal volumes.

The compartments may also be different from one another in terms of texture. Hence one compartment may be glossy, while the other is matt. This can be readily achieved as one side of a water-soluble film is often glossy, while the other has a matt finish. Alternatively the film used to make a compartment may be treated in a way so as to emboss, engrave or print the film. Embossing may be achieved by adhering material to the film using any suitable means described in the art. Engraving may be achieved by applying pressure onto the film using any suitable technique available in the art. Printing may be achieved using any suitable printer and process available in the art. Alternatively, the film itself may be colored, allowing the manufacturer to select different colored films for each compartment. Alternatively the films may be transparent or translucent and the composition contained within may be colored.

Unit dose compositions may have compartments which can be separate, but are preferably conjoined in any suitable manner. Most preferably the second and optionally third or subsequent compartments are superimposed on the first compartment. In one embodiment, the third compartment may be superimposed on the second compartment, which is in turn superimposed on the first compartment in a sandwich configuration. Alternatively the second and third compartments are superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment.

In a preferred embodiment the pouch may comprise three compartments consisting of a large first compartment and two smaller compartments. The second and third smaller compartments are superimposed on the first larger compartment. The size and geometry of the compartments are chosen such that this arrangement is achievable.

The geometry of the compartments may be the same or different. In a preferred embodiment the second and optionally third compartment have a different geometry and shape to the first compartment. In this embodiment the second and optionally third compartments are arranged in a design on the first compartment. Said design may be decorative, educative, illustrative for example to illustrate a concept or instruction, or used to indicate origin of the product. In a preferred embodiment the first compartment is the largest compartment having two large faces sealed around the perimeter. The second compartment is smaller covering less than 75%, more preferably less than 50% of the surface area of one face of the first compartment. In the embodiment wherein there is a third compartment, the above structure is the same but the second and third compartments cover less than 60%, more preferably less than 50%, even more preferably less than 45% of the surface area of one face of the first compartment.

The pouch is preferably made of a film material which is soluble or dispersible in water, and has a water-solubility of at least 50%, preferably at least 75% or even at least 95%, as measured by the method set out here after using a glass-filter with a maximum pore size of 20 microns:

50 grams±0.1 gram of pouch material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred pouch materials are polymeric materials, preferably polymers which are formed into a film or sheet. The pouch material can, for example, be obtained by casting, blow-molding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments of the present invention. A benefit in selecting different films is that the resulting compartments may exhibit different solubility or release characteristics.

Most preferred pouch materials are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

The pouch material herein can also comprise one or more additive ingredients. For example, it can be beneficial to add plasticizers, for example glycerol, ethylene glycol, diethyleneglycol, propylene glycol, sorbitol and mixtures thereof. Other additives include functional detergent additives to be delivered to the wash water, for example organic polymeric dispersants, etc.

For reasons of deformability pouches or pouch compartments containing a component which is liquid will preferably contain an air bubble having a volume of up to about 50%, preferably up to about 40%, more preferably up to about 30%, more preferably up to about 20%, more preferably up to about 10% of the volume space of said compartment.

The water soluble pouch may be made using any suitable equipment and method. Single compartment pouches are made using vertical, but preferably horizontal form filling techniques commonly known in the art. The film is preferably dampened, more preferably heated to increase the malleability thereof. Even more preferably, the method also involves the use of a vacuum to draw the film into a suitable mould. The vacuum drawing the film into the mould can be applied for 0.2 to 5 seconds, preferably 0.3 to 3 or even more preferably 0.5 to 1.5 seconds, once the film is on the horizontal portion of the surface. This vacuum may preferably be such that it provides an under-pressure of between −100 mbar to −1000 mbar, or even from −200 mbar to −600 mbar.

The moulds, in which the pouches are made, can have any shape, length, width and depth, depending on the required dimensions of the pouches. The moulds can also vary in size and shape from one to another, if desirable. For example, it may be preferred that the volume of the final pouches is between 5 and 300 ml, or even 10 and 150 ml or even 20 and 100 ml and that the mould sizes are adjusted accordingly.

Heat can be applied to the film, in the process commonly known as thermoforming, by any means. For example the film may be heated directly by passing it under a heating element or through hot air, prior to feeding it onto the surface or once on the surface. Alternatively it may be heated indirectly, for example by heating the surface or applying a hot item onto the film. Most preferably the film is heated using an infra red light. The film is preferably heated to a temperature of 50 to 120° C., or even 60 to 90° C. Alternatively, the film can be wetted by any mean, for example directly by spraying a wetting agent (including water, solutions of the film material or plasticizers for the film material) onto the film, prior to feeding it onto the surface or once on the surface, or indirectly by wetting the surface or by applying a wet item onto the film.

Once a film has been heated/wetted, it is drawn into an appropriate mould, preferably using a vacuum. The filling of the moulded film can be done by any known method for filling (preferably moving) items. The most preferred method will depend on the product form and speed of filling required. Preferably the moulded film is filled by in-line filling techniques. The filled, open pouches are then closed, using a second film, by any suitable method. Preferably, this is also done while in horizontal position and in continuous, constant motion. Preferably the closing is done by continuously feeding a second film, preferably water-soluble film, over and onto the open pouches and then preferably sealing the first and second film together, typically in the area between the moulds and thus between the pouches.

Preferred methods of sealing include heat sealing, solvent welding, and solvent or wet sealing. It is preferred that only the area which is to form the seal, is treated with heat or solvent. The heat or solvent can be applied by any method, preferably on the closing material, preferably only on the areas which are to form the seal. If solvent or wet sealing or welding is used, it may be preferred that heat is also applied. Preferred wet or solvent sealing/welding methods include applying selectively solvent onto the area between the moulds, or on the closing material, by for example, spraying or printing this onto these areas, and then applying pressure onto these areas, to form the seal. Sealing rolls and belts as described above (optionally also providing heat) can be used, for example.

The formed pouches can then be cut by a cutting device. Cutting can be done using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouch may be made together in a side-by-side style and consecutive pouches are not cut. Alternatively, the compartments can be made separately.

According to this process and preferred arrangement, the pouches are made according to the process comprising the steps of: a) forming an first compartment (as described above); b) forming a recess within some or all of the closed compartment formed in step a), to generate a second moulded compartment superposed above the first compartment; c) filling and closing the second compartments by means of a third film; d) sealing said first, second and third films; and e) cutting the films to produce a multi-compartment pouch.

Said recess formed in step b) is preferably achieved by applying a vacuum to the compartment prepared in step a). Alternatively the second, and optionally third, compartment (s) can be made in a separate step and then combined with the first compartment as described in our co-pending application EP 08101442.5 which is incorporated herein by reference. A particularly preferred process comprises the steps of: a) forming a first compartment, optionally using heat and/or vacuum, using a first film on a first forming machine; b) filling said first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch The first and second forming machines are selected based on their suitability to perform the above process. The first forming machine is preferably a horizontal forming machine. The second forming machine is preferably a rotary drum forming machine, preferably located above the first forming machine.

It will be understood moreover that by the use of appropriate feed stations, it is possible to manufacture multi-compartment pouches incorporating a number of different or distinctive compositions and/or different or distinctive liquid, gel or paste compositions.

Detergent Composition of the Unit Dose Product

At least one of the compartments of the unit dose product comprises the main wash detergent composition. One embodiment of the Unit Dose Product Detergent is shown below.

Unit Dose Composition

| | Wt % |
|---|---|
| Glycerol (min 99) | 5.3 |
| 1,2-propanediol | 10.0 |
| Citric Acid | 0.5 |
| Monoethanolamine | 10.0 |
| Caustic soda | — |
| Dequest 2010 | 1.1 |
| Potassium sulfite | 0.2 |
| Nonionic Marlipal C24EO7 | 20.1 |
| HLAS | 24.6 |
| Optical brightener FWA49 | 0.2 |
| Polyorganosiloxane Fluid-Silicone Resin Emulsion[1] | 0.05-15 |
| C12-15 Fatty acid | 16.4 |
| Polymer Lutensit Z96 | 2.9 |
| Polyethyleneimine ethoxylate PEI600 E20 | 1.1 |
| MgCl2 | 0.2 |
| Enzymes | ppm |

[1][Description of Polyorganosiloxane Fluid-Silicone Resin Emulsion of Example 1]

Fabric Softener
Processes of Making Cleaning Compositions

The cleaning compositions, such as, but not limited to, the fabric care compositions of the present disclosure can be formulated into any suitable form and prepared by any process chosen by the formulator, non-limiting examples of which are described in U.S. Pat. Nos. 5,879,584; 5,691,297; 5,574,005; 5,569,645; 5,565,422; 5,516,448; 5,489,392; and 5,486,303.

Methods of Using Fabric Care Compositions

The fabric care compositions disclosed in the present specification may be used to clean or treat a fabric, such as those described herein. Typically at least a portion of the fabric is contacted with an embodiment of the aforementioned fabric care compositions, in neat form or diluted in a liquor, for example, a wash liquor and then the fabric may be optionally washed and/or rinsed. In one aspect, a fabric is optionally washed and/or rinsed, contacted with an embodiment of the aforementioned fabric care compositions and then optionally washed and/or rinsed. For purposes of the present disclosure, washing includes but is not limited to, scrubbing, and mechanical agitation. The fabric may comprise most any fabric capable of being laundered or treated.

The fabric care compositions disclosed in the present specification can be used to form aqueous washing solutions for use in the laundering of fabrics. Generally, an effective amount of such compositions is added to water, preferably in a conventional fabric laundering automatic washing machine, to form such aqueous laundering solutions. The aqueous washing solution so formed is then contacted, preferably under agitation, with the fabrics to be laundered therewith. An effective amount of the fabric care composition, such as the liquid detergent compositions disclosed in the present specification, may be added to water to form aqueous laundering solutions that may comprise from about 500 to about 7,000 ppm or even from about 1,000 to about 3,000 pm of fabric care composition.

In one aspect, the fabric care compositions may be employed as a laundry additive, a pre-treatment composition and/or a post-treatment composition.

While various specific embodiments have been described in detail herein, the present disclosure is intended to cover various different combinations of the disclosed embodiments and is not limited to those specific embodiments described herein. The various embodiments of the present disclosure may be better understood when read in conjunction with the following representative examples. The following representative examples are included for purposes of illustration and not limitation.

Test Methods

Time-to Wick (T2W) Measurement Protocol

The fabric Time to Wick property is measured as follows: The test is conducted in a room or chamber with air temperature of 20-25° C. and Relative Humidity of 50-60%. All fabrics and paper products used in the test are equilibrated in the temperature and humidity condition of the test location for 24 hrs prior to collecting measurements. On a flat, horizontal and level, impermeable surface, place 1 piece of test fabric 8 cm×10 cm in size, on top of a single sheet of kitchen paper towel (eg Bounty). The fabric surface facing upwards, which is not in contact with the paper towel, can be either side of the fabric. Visually confirm that the fabric is lying flat and in uniform contact with the paper towel before proceeding. Distilled Water is used as the testing liquid. Automated single or multi-channel pipettes (eg Rainin, Gilson, Eppendorf), are used to deliver a liquid droplet size of 300 μL of the testing liquid onto the fabric surface. A stop-watch or timer is used to count time in seconds, from the moment when the liquid droplet contacts the fabric surface. The timer is stopped when the whole droplet of the test liquid wets into the fabric. The point when the liquid droplet wets into the fabric is determined by visual observation that the liquid droplet has moved from sitting above the fabric surface to having completely penetrated into the fabric. The time period shown elapsed on the timer is the Time to Wick Measurement. The test is stopped after 20 minutes if wetting of the liquid droplet has not been seen yet. The Time to Wick measurement is recorded as >20 mins in this case. If wetting of the liquid is seen immediately upon contact of the droplet with the fabric surface, then the Time to Wick property is recorded as 0 for that fabric. Multiple repeats are performed for each test fabric. These replicates are comprised of 10 pieces of each test fabric, and 3 droplets of test liquid per piece of fabric, resulting in a total of 30 droplets being measured per test fabric. In addition to the average of the 30 Time to Wick measurements, the Standard Deviation and the 95% confidence interval should also be reported.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A surface treatment composition which comprises:
   A.) an aqueous polyorganosiloxane-silicone resin mixture comprising:
      i) about 2% to about 95%, by weight of the mixture, of one or more polyorganosiloxane fluid compounds, wherein each polyorganosiloxane fluid compound contains at least 80 mol % of units selected from the group consisting of units of the general formulae Ia, Ib, II and III:

$$R^1_2SiO_{(2/2)} \quad \text{(Ia)},$$

$$R^1_a R^2_b SiO_{(2/2)} \quad \text{(Ib)},$$

$$R^3_3 SiO_{(1/2)} \quad \text{(II)},$$

$$R^3_2 R^4 SiO_{(1/2)} \quad \text{(III)},$$

in which:
a has the value 0, 1 or 2, b has the value 1 or 2, and the sum of a and b is equal to 2;
$R^1$ means monovalent hydrocarbon residues with 1 to 40 carbon atoms, optionally substituted with halogens;
$R^2$ means either:
a) aminoalkyl residues of the general formula IV $$-R^5-NR^6R^7 \quad \text{(IV)},$$

wherein:
$R^5$ means divalent hydrocarbon residues with 1 to 40 carbon atoms,
$R^6$ means monovalent hydrocarbon residues with 1 to 40 carbon atoms, H, hydroxymethyl or alkanoyl residues, and
$R^7$ means a residue of the general formula V $$-(R^8-NR^6)_x R^6 \quad \text{(V)},$$

wherein:
x has the value 0 or an integer value from 1 to 40, and
$R^8$ means a divalent residue of the general formula VI $$-(CR^9_2-)_y- \quad \text{(VI)},$$

wherein:
y has an integer value from 1 to 6, and
$R^9$ means H or monovalent hydrocarbon residues with 1 to 40 carbon atoms, or b) aminoalkyl residues of the general formula IV wherein $R^6$ and $R^7$ together with the N atom forms a cyclic organic residue with 3 to 8 —$CH_2$— units, and where nonadjacent —$CH_2$— units can be replaced by units that are chosen from —C(=O)—, —NH—, —O—, and —S—, $R^3$ means monovalent hydrocarbon residues with 1 to 40 carbon atoms optionally substituted with halogens,
$R^4$ means the residues —OR or —OH, wherein R means monovalent hydrocarbon residues with 1 to 40 carbon atoms, optionally substituted with halogens, wherein:
the average ratio of the sum of units of formula Ia and Ib to the sum of units of formulae II and III within the one or more polyorganosiloxane fluid compounds ranges from 0.5 to 500, the average ratio of units of formula II to the units of formula III within the one or more polyorganosiloxane fluid compounds ranges from 1.86 to 100, and the one or more polyorganosiloxane fluid compound have an average amine number of at least 0.01 meq/g of polyorganosiloxane fluid compounds;

ii) from about 1% to about 48%, by weight of the mixture, of one or more silicone resins, each of which contain at least 80 mol % of units selected from the group consisting of units of the general formulas VII, VIII, IX and X $R^{10}{}_3SiO_{1/2}$ (VII), $R^{10}{}_2SiO_{2/2}$ (VIII), $R^{10}SiO_{3/2}$ (IX), $SiO_{4/2}$ (X), in which:
$R^{10}$ means H, —OR, —OH residues, or residues monovalent hydrocarbon residues with 1 to 40 carbon atoms optionally substituted with halogens, and wherein at least 20 mol % of the units are selected from units of the general formulae IX and X, and a maximum of 10 wt % of the $R^{10}$ residues are —OR and —OH residues; and iii) a protonation agent;

iv) at least about 5%, by weight of the mixture, of water; and v) optionally, less than about 5%, by weight of the mixture, of an emulsifier; and B) a carrier;

C) a perfume; and

D) a dye transfer inhibitor; wherein the surface treatment composition is selected from the group consisting of laundry spray composition, laundry rinse additive composition, liquid laundry detergent compositions, solid laundry detergent compositions, hard surface cleaning compositions, liquid hand dishwashing compositions, solid automatic dishwashing compositions, liquid automatic dishwashing, and tab/unit dose form automatic dishwashing compositions and laundry detergent compositions contained in a water-soluble pouch.

2. A surface treatment composition according to claim 1, further comprising a surfactant system where the surfactant system comprises $C_{10}$-$C_{16}$ alkyl benzene sulfonates.

3. A surface treatment composition according to claim 2, where the surfactant system comprises $C_8$-$C_{18}$ linear alkyl sulfonate surfactant.

4. A surface treatment composition according to claim 2, where the surfactant system further comprises one or more co-surfactants selected from the group consisting of nonionic surfactants, cationic surfactants, anionic surfactants and mixtures thereof.

5. A surface treatment implement comprising a nonwoven substrate and the surface treatment composition according to claim 1.

* * * * *